(12) United States Patent
Minamizawa et al.

(10) Patent No.: US 6,298,421 B1
(45) Date of Patent: Oct. 2, 2001

(54) DATA STORAGE DEVICE

(75) Inventors: Fumihiro Minamizawa, Toyoake; Kazuhiro Kuwabara, Handa, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/227,898

(22) Filed: Jan. 11, 1999

(30) Foreign Application Priority Data

Jan. 12, 1998 (JP) ................................................ 10-004188
Jan. 12, 1998 (JP) ................................................ 10-004198
Jan. 12, 1998 (JP) ................................................ 10-004200
Jan. 23, 1998 (JP) ................................................ 10-011683

(51) Int. Cl.$^7$ ................................................ G06F 12/08
(52) U.S. Cl. ........................... 711/151; 711/152; 711/164
(58) Field of Search .................................. 711/151, 152, 711/163, 164

(56) References Cited

U.S. PATENT DOCUMENTS

| | | |
|---|---|---|
| 4,521,853 | * 6/1985 | Guttag . |
| 4,965,828 | * 10/1990 | Ergott, Jr. et al. ..................... 380/50 |
| 5,046,076 | 9/1991 | Hill ........................................ 377/8 |
| 5,059,772 | 10/1991 | Younglove .......................... 235/383 |
| 5,396,600 | 3/1995 | Thompson et al. .................. 395/325 |
| 5,412,791 | 5/1995 | Martin et al. ....................... 395/425 |
| 5,416,914 | 5/1995 | Korngiebel et al. ................ 395/425 |
| 5,548,728 | * 8/1996 | Danknick ........................... 709/213 |
| 5,550,997 | * 8/1996 | Ip et al. .............................. 711/103 |
| 5,600,821 | 2/1997 | Falik et al. ....................... 395/497.04 |
| 5,675,769 | 10/1997 | Ruff et al. ....................... 395/497.04 |
| 6,092,161 | * 7/2000 | White et al. ........................ 711/163 |

* cited by examiner

Primary Examiner—Matthew Kim
Assistant Examiner—Christian P. Chace
(74) Attorney, Agent, or Firm—Oliff & Berridge PLC

(57) ABSTRACT

During a normal update process, a password transmitted from a personal computer is compared with password already stored in a flash memory. When the passwords match, a transmitted program is written over the stored program. When a change mode is set by a user, the transmitted password is not compared with the stored password. The transmitted program is written over the stored program. Alternatively, even when the two passwords are compared and the, two passwords do not match, if the change mode is being set, the transmitted program is written over the stored program. Accordingly, during the change mode, regardless of whether or not the transmitted password matches the stored password, the transmitted program is written over the stored program.

50 Claims, 18 Drawing Sheets

FIG.5

PJL COMMAND

| ESC | % | - | 1 | 2 | 3 | 4 | 5 | X | @ | P | J | L | E | N | T | E | R | = | F | L | A | S | H | CR |

FIXED CHARACTER TRAIN

| A | B | C | | F | A | X | | F | L | A | S | H | | D | A | T | A |

PASSWORD FOR DISTINGUISHING MODEL/COUNTRY

| A | B | C | 9 | 8 | 7 | 6 | | J | P | N |

START RECORD

| FFH | 00H |

DATA RECORD

| APPENEDE FIELD | ADDRESS FIELD | DATA FIELD | CHECKSUM FIELD |

⋮

CONTENT OF DATA FIELD

| PROGRAM | PROGRAM |
|---|---|
| PASSWORD DISTINGUISHING MODEL/COUNTRY | A B C 9 8 7 6   J P N |
| LOAD COMPLETION MARK | P r g r a m O K |
| PREPARATION DATE | 98H 01H 01H 00H 00H |
| CHECKSUM | 12H 34H |

⋮

| APPENEDE FIELD | ADDRESS FIELD | DATA FIELD | CHECKSUM FIELD |

COMPLETE RECORD

| 00H | 00H |

DATA STORAGE DEVICE

BACKGROUND OF THE INVENTION

1. Field of the Invention

The present invention relates to a data storage device for downloading, into a rewritable non-volatile memory such as a flash memory, control data such as a variety of programs and information for controlling operations of an electronic device.

2. Description of Related Art

Electronic devices, such as printers, are exported to various countries around the world. Often, specifications of the electronic devices differ depending on the target country, to which the electronic devices are to be shipped out. Even though the target country, to which the electronic devices are to be shipped out, are the same, specifications of the electronic devices will still differ depending on a model type of the electronic devices.

It is noted that when a different control board is produced and mounted to an electronic device for each different model and for each target county, then the number of parts mounted in the electronic devices will increase.

In view of this problem, recently a general use control board is mounted in each electronic device. The control board is produced to mount thereon a flash memory as a program memory device. Only a main program downloaded to the flash memory is changed according to the model type and to the target country. In more detail, a common boot loader program is prestored in the flash memory. The boot loader is the same for all the countries and for all the model types. The boot loader is used to download a main program especially for each country and for each model type into the flash memory. The electronic device thus mounted with the control board stored with the main program is treated as a corresponding model and shipped out to a corresponding country.

SUMMARY OF THE INVENTION

After the electronic device stored with the main program is shipped out and purchased by a user, the user will sometimes need to update the main program.

It is noted, however, that the user will possibly download an update program with different specifications into his/her electronic device. When the user thus erroneously downloads the main program with different specifications, differences in between countries and models can interfere with operations of the electronic device.

Because Internet is recently used in common, it is conceivable to simply distribute update main programs over the Internet even to the overseas clients. In the future, a manufacturer of the electronic device can produce a homepage with a plurality of links to a plurality of update main programs corresponding to different countries and to different model types. The user may download, into his or her personal computer, one of the update main programs that corresponds to his or her electronic device. The user then downloads the update main program into his or her electronic device. It should be noted that the processes for updating the main program is one of download processes because the updating process includes the process for downloading an update program into the flash memory.

Although the above-described conceivable method for distributing programs is convenient, using the Internet can let the user accidentally select an erroneous link of the homepage and download programs with different specifications. When this happens, because the electronic device is mounted with the general boot loader, the main program of the electronic device will be erroneously exchanged with a program for a different specification.

Especially when the electronic device is a printer, the printer is generally used as being connected to a personal computer. When performing printing operations, the printer will output a busy signal to the personal computer to instruct the computer not to send new print data to the printer because the printer is presently being busy in performing printing operations for the already-received print data. When the printer runs out of paper, the printer will output a paper empty signal to the personal computer to inform that the printer can not perform printing operations any more.

When the printer outputs the control signal, such as the busy signal and the paper empty signal, to the personal computer, the personal computer can not transmit not only print data but also a variety of control signals to the printer. The personal computer can not transmit, to the printer, even the update main program data that has, been downloaded to the personal computer. This is extremely inconvenient because the user can not update the main program when he or she needs to.

It is convenient that not only the main program but also the boot loader program can be updated through downloading an update boot loader program into the electronic device. It is conceivable to download the update boot loader program into the electronic device through Internet in the same manner as described above for the main program.

It is conceivable that the electronic device updates or exchanges the main program or the boot loader program with newly-received program data while referring only to address data appended to the program data. Accordingly, when the electronic device receives program data with errors in the address data, the electronic device will erroneously rewrite the boot loader program. The boot loader program serves as an extremely important role for controlling loading operations of a main program. Accordingly, such an erroneously-rewritten boot loader program may prevent the electronic device from even starting up.

It is conceivable to solve this problem using hardware. For example, it is conceivable to perform a predetermined setting to one or more data input/output pin (IO pin) provided to the flash memory, thereby prohibiting the boot loader program from erroneously being rewritten. This method is, however, troublesome.

It is therefore an objective of the present invention to solve the above-described problems, and to provide an improved data storage device that can properly download control data, such as the program for controlling the electronic device, into the flash memory through selectively allowing the download operation.

In order to attain the above and other objects, the present invention provides a data storage device, comprising: a rewritable nonvolatile memory capable of storing control data; means for selectively setting a predetermined download operation mode; and means for performing downloading operation to receive inputted control data and to write the received control data to the nonvolatile memory according to the selectively-set download operation mode.

The mode setting means may include means for selectively setting one of a rewritable mode to allow the downloading means to write the inputted control data over the control data already stored in the nonvolatile memory and an initially-writing mode to allow the downloading means to write the inputted control data initially into the nonvolatile memory.

The data storage device may further comprise means for executing operations based on the control data stored in the nonvolatile memory.

According to another aspect, the present invention provides a data storage device comprising: a rewritable nonvolatile memory including: a control data storing region for storing control data such as a program and a variety of information for controlling operations of an electronic processing device; and a specification indication data storage region storing specification indication data for indicating specifications of the electronic processing device to be controlled by the control data; reception means for receiving transmitted control data and specification indication data; collating means for, when the reception means receives the transmitted specification indication data, collating the transmitted specification indication data with the specification indication data stored in the specification indication data storage region; updating means for, when the transmitted specification indication data and the specification indicated data collated by the collation means match, rewriting the control data storage region using the transmitted control data received by the reception means; and mode setting means for setting a specific rewritable mode for rewriting the control data storage region using the transmitted control data received by the reception means, the updating means rewriting, during the specific rewritable mode set by the mode setting means, the control data storage region using the transmitted control data received by the reception means even when the transmitted specification indication data and the specification indication data collated by the collation means do not match and even when the collation means does not perform the collating operation.

According to a further aspect, the present invention provides a data rewriting device comprising: a rewritable nonvolatile memory including: a control data storing region for storing control data such as a program and a variety of information for controlling operations of an electronic processing device; and a loader program storage region for storing loader program data for controlling load operations of the control data into the control data storing region during both initial load of the control data and update of the control data; reception means capable of receiving transmitted control data and loader program data transmitted from an external transmission device; mode setting means for setting a rewrite mode enabling rewrite of the transmitted loader program data; and rewrite means for, when the mode setting means sets the rewrite mode, rewriting the loader program storing region using the transmitted loader program data received by the reception means.

Each of the control data and the loader program data may be appended with different address data. The data rewrite device may further comprise judgement means for judging whether transmitted data received by the reception means is control data based on the appended address data, the rewrite means rewriting the control data storing region using the transmitted control data when the judgement means judges that the transmitted data received by the reception means includes control data. The data rewrite device may further comprise means for deleting the transmitted data received by the reception means when the judgement means judges, while the rewrite mode is not being set, that the transmitted data received by the reception means is not control data.

According to another aspect, the present invention provides a printing system comprising: a print device including: transmission/reception means capable of receiving print data and control data and for transmitting a specific control signal indicative of condition of the print device; print means for printing images on a print medium based on the received print data: and a rewritable nonvolatile memory for storing the control data such as programs and a variety of information for controlling operations of the print means; an external transmission device, connected to the print device, for transmitting the control data and the print data and for receiving the specific control signal; prevention means for outputting a prevention signal to the transmission/reception means to prevent the transmission/reception means from transmitting the specific control signal; and update means for, when the prevention means outputs the prevention signal, rewriting the nonvolatile memory using transmitted control data.

The prevention means and the update means may be provided in the print device. The specific control signal may include at least one of a print medium empty signal and a busy signal that are outputted corresponding to a printing impossible condition of the print means.

According to still another aspect, the present invention provides a data storage device comprising: a rewritable nonvolatile memory for storing control data such as a program and a variety of information for controlling operations of an electronic processing device; download means for downloading control data to the nonvolatile memory; and notification means for externally notifying load process condition using a different notification form for each load process step, from when download of control data by the download means is started until when download is completed.

BRIEF DESCRIPTION OF THE DRAWINGS

The above and other objects, features and advantages of the invention will become more apparent from reading the following description of the preferred embodiment taken in connection with the accompanying drawings in which:

FIG. 5 is a schematic view showing configuration of data in the main program;

DETAILED DESCRIPTION OF THE PREFERRED EMBODIMENTS

Figure 1:
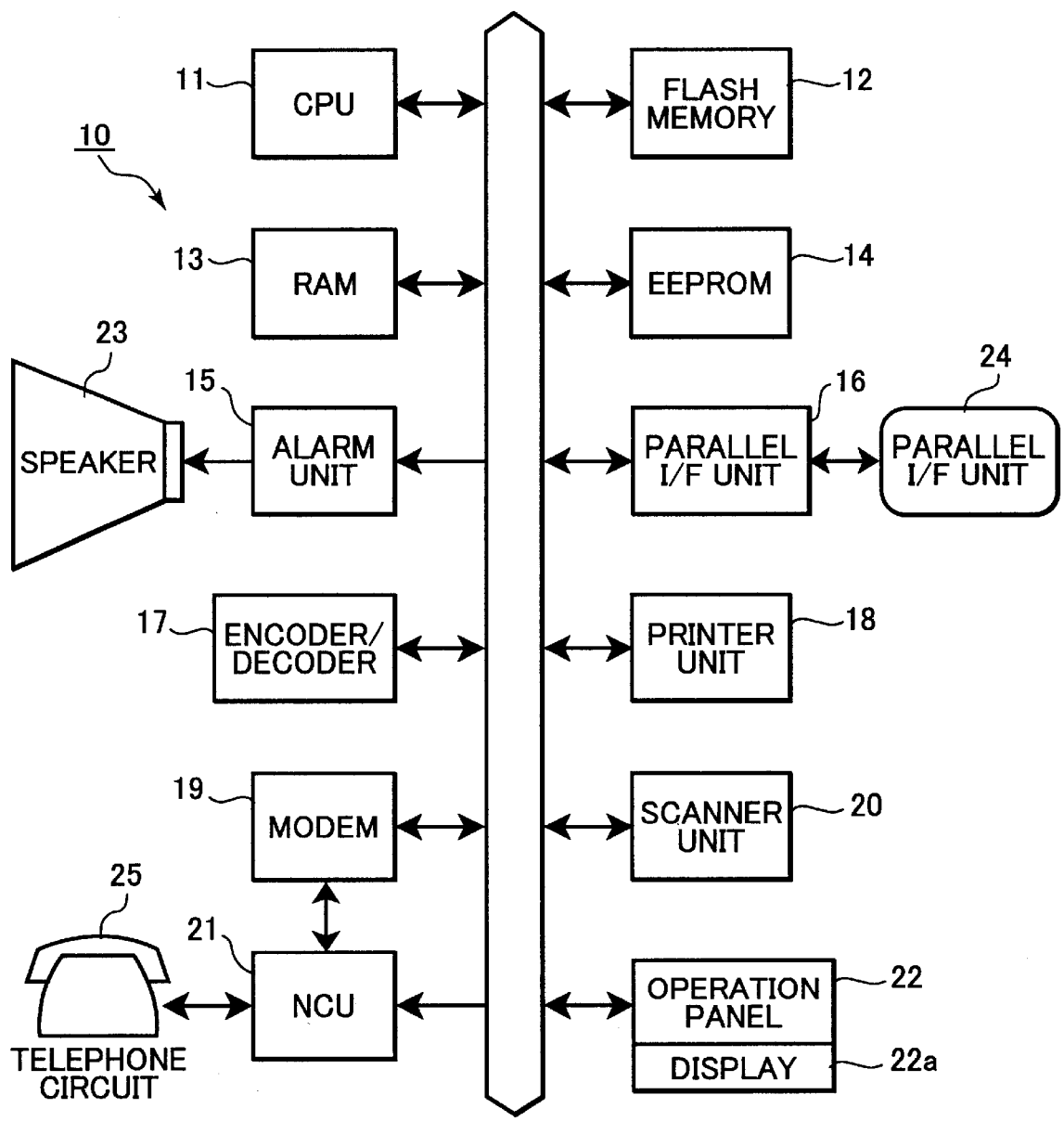
FIG. 1 is a block diagram showing electric components of a multi-function device according to a first embodiment of the present invention.

A data storage device according to preferred embodiments of the present invention will be described while referring to the accompanying drawings wherein like parts and components are designated by the same reference numerals to avoid duplicating description.

First Embodiment

A data storage device of a first embodiment will be described below with reference to FIGS. 1 through 11.

The data storage device of the first embodiment is a multi-function device that is downloaded with an operating program (main program) for performing a facsimile function, a printer function, a copy machine function, and a scanner function.

As shown in FIG. 1, the multi-function device 10 includes a CPU 11, a flash memory (non-volatile memory) 12, a RAM 13, an EEPROM (Electrically Erasable Programmable ROM) 14, an alarm unit 15, a parallel I/F (Interface) unit 16, an encoding/decoding unit 17, a printer unit 18, a modem 19, a scanner unit 20, a network control unit (NCU) 21, and an operation panel 22, all of which are interconnected with one another via a bus line. The flash memory 12 stores therein a main program and a boot loader program as will be described later with reference to FIG. 2. A user of the multi-function device 10 can manipulate the operation panel 22 to input his/her desired function selection. The CPU 11 executes the main program, according to a result of the function selection, thereby achieving the selected facsimile function, printer function, copy machine function, scanner function, or the like according to the flowchart of FIG. 11 as will be described later.

Figure 2:
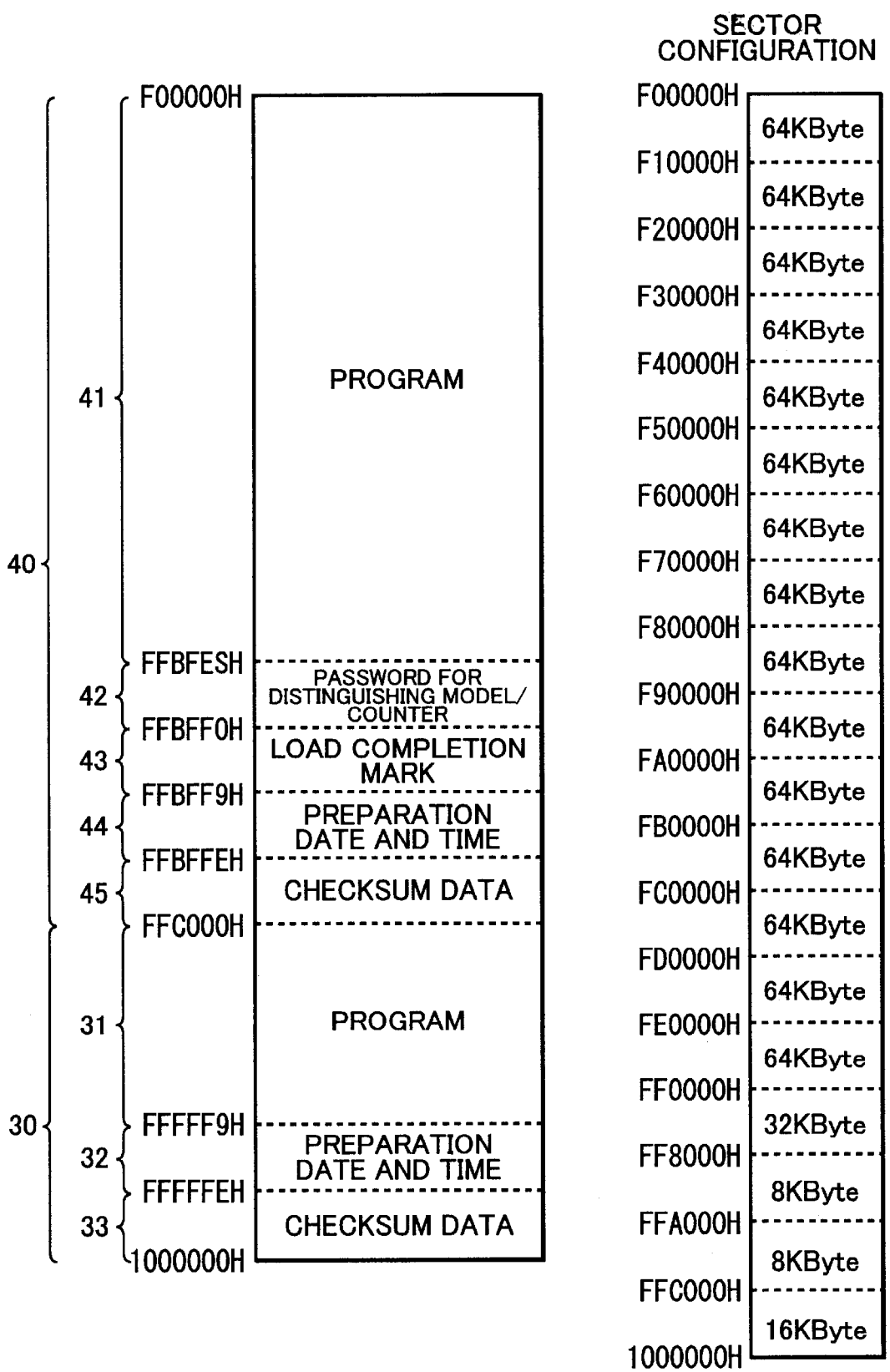
FIG. 2 is a schematic view showing configuration of a flash memory of the multi-function device.

As shown in FIG. 2, the flash memory 12 is configured from: a boot loader area 30 and a main program area 40. The boot loader area 30 includes: a boot loader program storage region 31; a boot loader preparation date and time storage region 32; and a boot loader checksum storage region 33. The boot loader program storage region 31 is for storing a boot loader program for executing processes shown in FIGS. 6–10. The boot loader preparation date and time storage region 32 is for storing preparation time data indicating date and time when the boot loader program has been produced. The boot loader checksum storage region 33 is for storing checksum data for the boot loader area 30.

The main program area 40 includes: a main program storage region 41: a password storage region 42; a completion mark storing region 43; a main program preparation time storage region 44; and a main program checksum storage region 45. The main program storage region 41 is for storing a main program for executing processes of FIG. 11. The password storage region 42 is for storing data of a password for distinguishing a model of the present multi-function device 10 and a target country to which the present multi-function device 10 should be shipped out. The completion mark storing region 43 is for storing a load completion mark for indicating completion of processes for loading the main program. The main program preparation time storage region 44 is for storing preparation time data Indicating date and time when the main program has been produced. The main program checksum storage region 45 is for storing checksum data for the main program area 40.

The RAM 13 is for storing various data calculated by the CPU 11 and various mode flags, counters, and other settings set by the CPU 11 through execution of the boot loader program and the main program.

The EEPROM 14 stores information such as one-touch dial information that is capable of being set by the user using the operation panel 22. The alarm unit 15 is provided with a speaker 23, and is for outputting from the speaker 23 notification sound that have different forms by appropriately combining a time length when the sound is produced and tone of the sound in correspondence with a variety of different situations such as when an error is generated and when a download operation of a program is completed.

Figure 3:
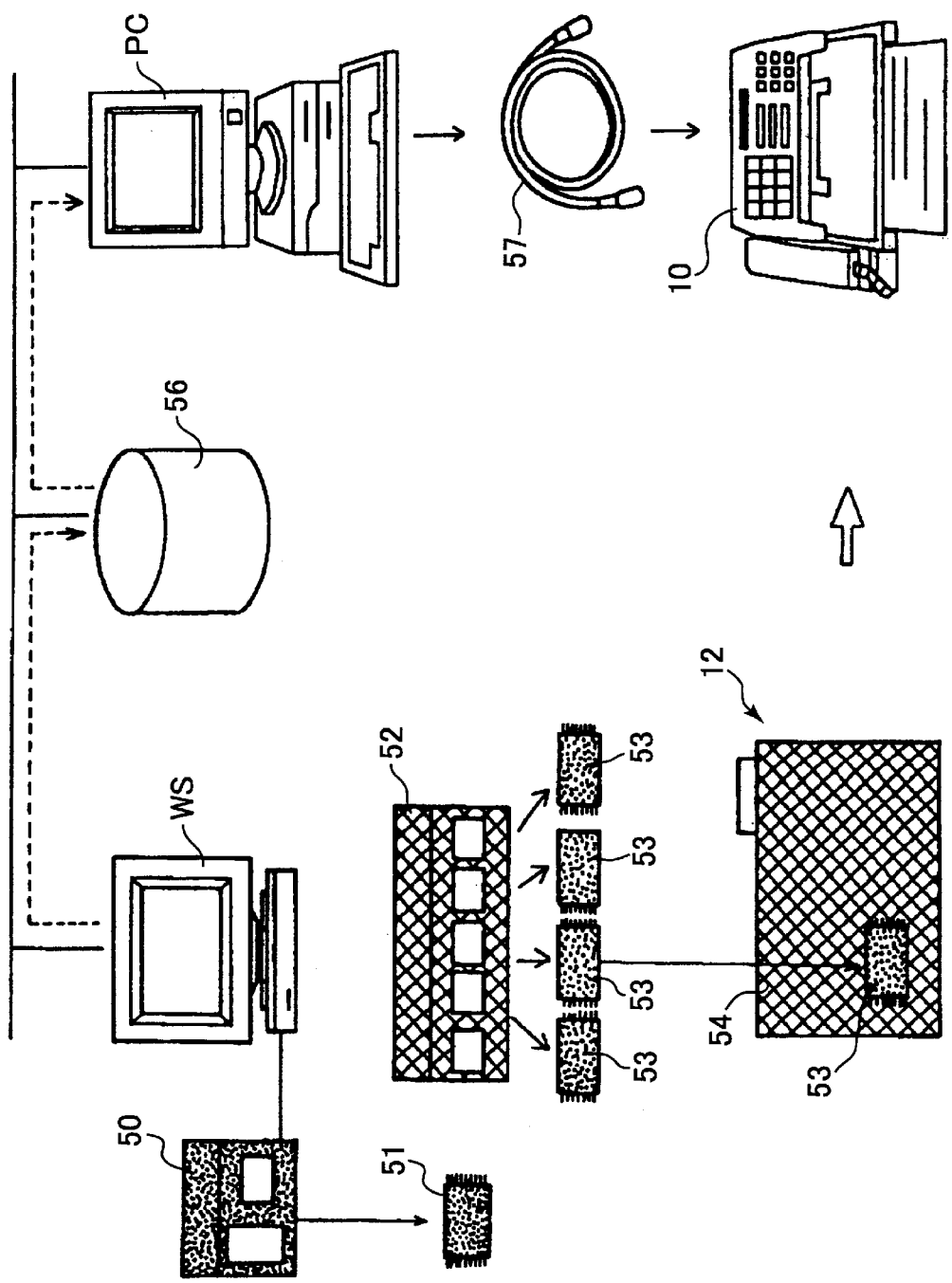
FIG. 3 is a schematic view showing methods for downloading programs during manufacture of the multi-function device.
Figure 4:
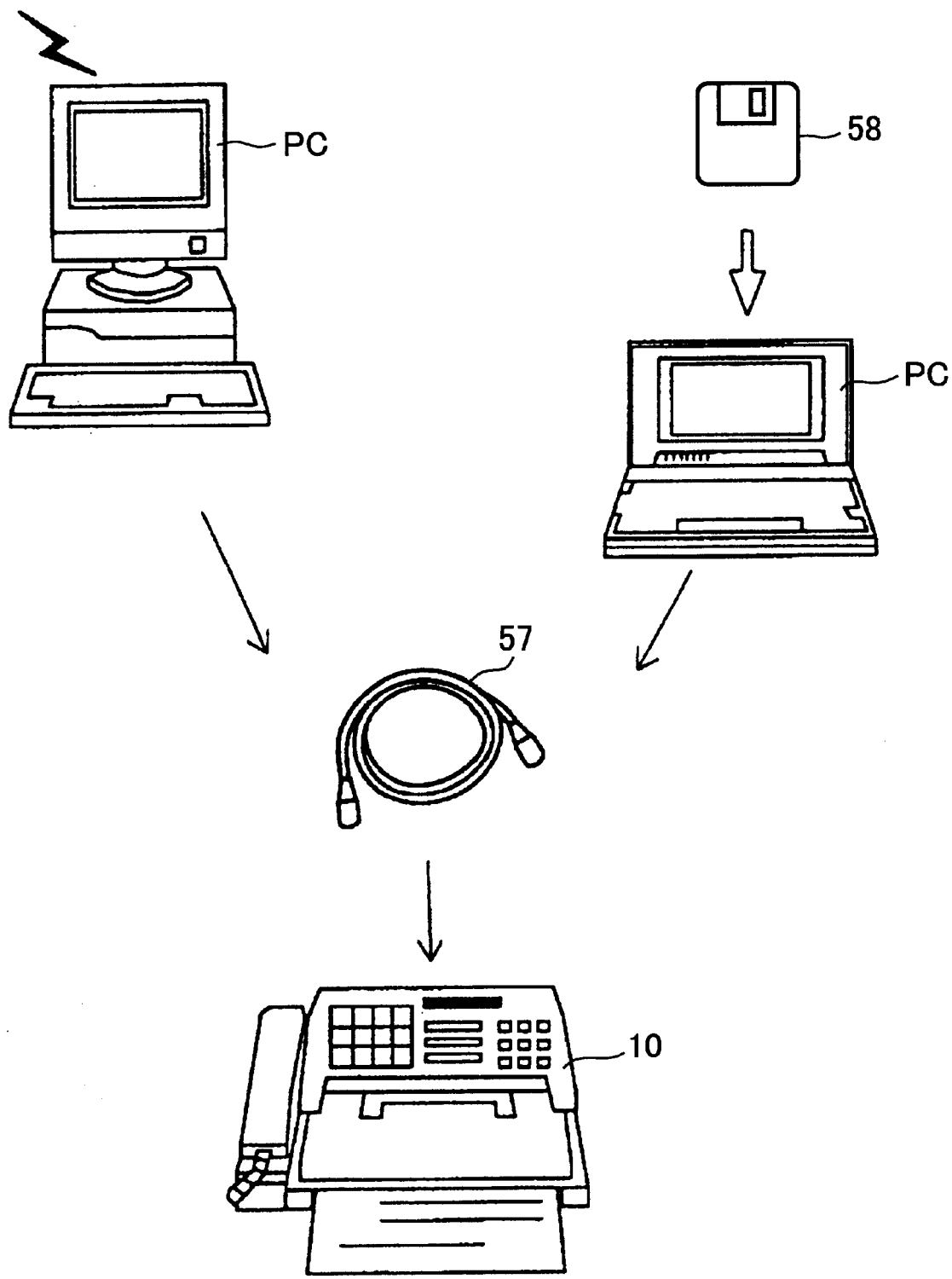
FIG. 4 is a schematic view showing methods for downloading programs when updating the main program of the multi-function device.

The parallel I/F unit 16 is connected to a parallel port 24, which can be connected to each personal computer PC shown in FIGS. 3 and 4. The parallel I/F unit 16 is for performing communication of data with the personal computer PC over the parallel port 24. As will be described later the main program is downloaded from the personal computer PC over the parallel port 24 and the parallel I/F unit 16. The multi-function device 10 functions as a printer when it receives print data from the personal computer PC over the parallel port 24 and the parallel I/F unit 16.

The scanner unit 20 is for performing a scanning operation to retrieve image data from an original document. The printer unit 18 is for performing a printing operation to print out print data onto a sheet of paper. The NCU 21 is connected to a general telephone circuit 25. The NCU 21 is for transmitting a facsimile transmission signal to a remote device and for receiving a facsimile reception signal from the remote device. The modem 19 is for modulating facsimile transmission data into a facsimile transmission signal to be transmitted via the NCU 21 through the telephone circuit 25. The modem 19 is also for demodulating, into facsimile reception data, a facsimile reception signal received via the NCU 21 from the telephone circuit 25.

The encoding/decoding unit 17 is for performing processes to encode image data, retrieved by the scanner unit 20 from the original document, into facsimile transmission data. The encoding/decoding unit 17 is also for performing processes to decode facsimile reception data, received from a remote device, into print data capable of being printed out by the printer unit 18. With this structure, facsimile transmission data encoded by the encoding/decoding unit 17 is transmitted by the general telephone circuit 25 over the modem 19 and the NCU 21. Also, facsimile reception data, received from the telephone circuit 25 over the modem 19 and the NCU 21, is decoded by the encoding/decoding unit 17 and is transferred to the printer unit 18, which then prints images on a sheet accordingly.

The operation panel 22 includes: ten keys for enabling the user to input telephone numbers; and several operation keys such as a start key, a stop key, and a function selection key. When the user selects a function using the operation panel 22, the multi-function device 10 operates according to the selected function, that is, in a manner of the facsimile machine, a printer, a copy machine, and the like. The operation panel 22 is also provided with a liquid crystal display 22a for displaying a variety of messages and values inputted through the ten key pad.

The multi-function device 10 having the above-described structure is manufactured and is downloaded with a main program in a manner described below.

As shown in FIG. 3, the flash memory 12 to be mounted in the multi-function device 10 is first produced in a manner described below.

First, a flash memory programmer 50 is connected to a workstation WS. Then, a master chip 51 storing a boot load program is produced. Next, the master chip 51 is set in another flash memory programmer 52, and the master chip 51 is copied onto a plurality of copy chips 53. The thus produced plural copy chips 53 are mounted on a plurality of control boards 54, respectively. Then, each board 54 is assembled into a multi-function device 10.

Next, the main program is prepared at the workstation WS, and is uploaded into a database 56. A personal computer PC is connected to the database 56, and the main program is downloaded into the personal computer PC. After the main program has been downloaded into the personal computer PC, the personal computer PC and the multi-function device 10 are connected together by a printer cable 57. When power of the multi-function device 10 is turned on, as will be described later with reference to FIGS. 6–10, the boot loader program is started and the main program is initially loaded into the multi-function device 10. Thus, the multi-function device 10 is produced.

After a user purchases the multi-function device 10, programs in the multi-function device 10 can be updated by the user using his/her personal computer PC in a manner described below with reference to FIG. 4.

The manufacture of the multi-function device 10 can provide information on its own Internet homepage for availability of update programs and a method of downloading the update programs to the multi-function device 10. The user who uses the homepage can download over the Internet the updated programs into his or her own personal computer PC as shown in FIG. 4. Then, the multi-function device 10 is connected to the personal computer PC via a printer cable 57. Then, when the power of the multi-function device 10 is turned on, as will be described later with reference to FIGS. 6–11, the updated programs are downloaded from the personal computer PC to the multi-function device 10. Alternatively, the manufacture of the multi-function device 10 can store the updated program On a portable storage medium 58 such as a floppy disk or a CD ROM, and then supply the portable storage medium 58 to each user of the multi-function device 10. The user sets the portable storage medium 58 into his or her personal computer PC and then downloads the update program over the printer cable 57 to the multi-function device 10 in the same manner as when receiving update program over the Internet.

It should be noted that the multi-function device 10 is produced in a variety of different models, in that the main program is different to each model. Also, each different model uses a different main program depending on the target country where it is to be used. However, the different main programs can all be downloaded into the multi-function device 10 using the same boot loader program. Thus, all the multi-function devices 10 of all the models and for all the countries are designed to use the circuit boards 54 mounted with the same copy chips 53.

As shown in FIG. 5, the main program prepared at the workstation WS is configured in order from its lead position:
a PJL command, a fixed character train, a password for distinguishing model and target county, a start record, a data record, and a complete record.

The PJL command is a command for allowing the CPU 11 to distinguish that data stored subsequent to the PJL command is a program and not print data. The subsequent fixed character train is data for allowing the CPU 11 to distinguish that the program is for the present multi-function device 10.

The password for model/target counties, which follows the fixed character train, is a password for allowing the CPU 11 to distinguish the model and the target country of the multi-function device 10, for which the subject program should be used. The start record and the complete record are for distinguishing start and completion of the data record region.

The data record is configured from: an appended field, an address field, a data field, and a checksum field. The appended field stores: data indicating that this is a data record; and data for judging the amount or number of data in the data field. The address field stores data relating to storage address in the flash memory 12 where data in the data field should be stored. The checksum field stores data indicating a total value calculated for data in the appended field, in the address field, and in the data field.

The data field stores: a program; a password for distinguishing the model/target country of the multi-function device 10, for which the present data should be used, a main program load completion mark, a main program preparation time data, and the main program area checksum data. The data is stored in the data field in the following order from start record to complete record: program, model/target country distinguishing password, main program load completion mark, main program preparation time data, and main program area checksum data.

With the above-described structure, the multi-function device 10 executes processes as shown in FIGS. 6 to 11 according to the boot loader program and the main program stored in the flash memory 12. The processes include: initial load of a main program to the multi-function device 10; update load of the main program to the multi-function device 10; and execution of the thus downloaded main program.

Figure 6:
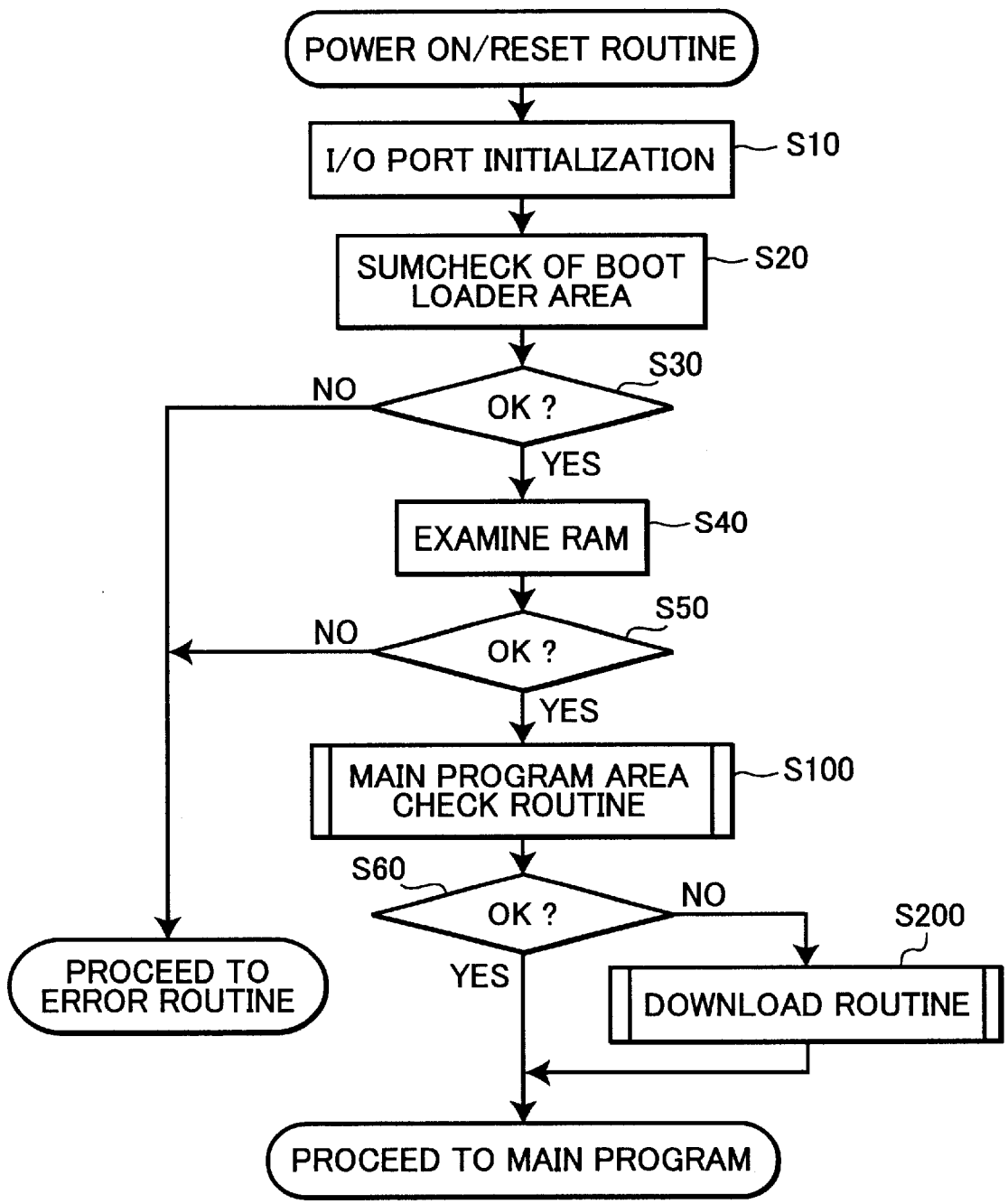
FIG. 6 is a flowchart representing operations performed when the multi-function device is turned on or reset according to the first embodiment.

When power of the multi-function device 10 is turned on, then the processes represented by the flowchart in FIG. 6 is started.

First in S10, the CPU 11 executes initialization of I/O ports. Next in S20, the CPU 11 performs checksum processes for the boot loader area 30 in the flash memory 12 That is, the CPU 11 calculates the sum total of all data in the boot loader area 30 except for data in the boot loader checksum storage region 33, and then compares the calculated sum value with the checksum value stored in the checksum storage region 33. Next in S30, the CPU 11 judges whether or not the sum total is properly equal to the checksum value stored in the checksum storage region 33. If the sum total properly matches the checksum value (S30:YES), then in S40, the RAM 13 is examined for determining whether it is properly operating as a device. Next in S50, the CPU 11 judges whether or not the examination of the RAM 13 shows that the RAM 13 is properly operating. If so (S50:YES), then in S100, the CPU 11 executes processes for checking the main program area 40.

Figure 11:
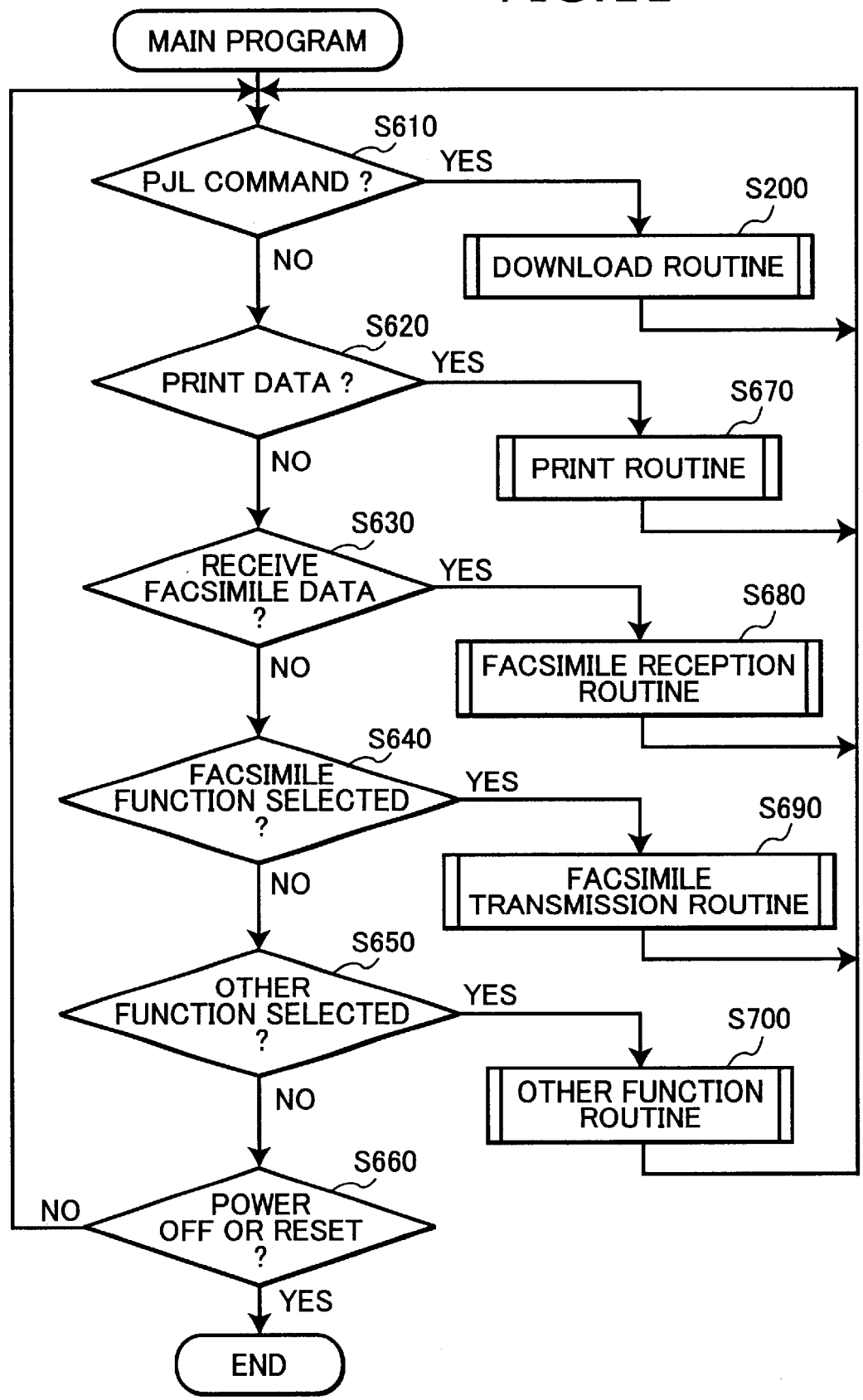
FIG. 11 is a flowchart representing execution of a main program.

Next in S60, the CPU 11 judges whether or not the processes of S100 for checking the main program area 40 shows that the main program area 40 is normal or not. If the main program area 40 is normal (S60:YES), then, as will be described later, the CPU 11 starts up a main program execution routine as shown in FIG. 11. On the other hand, when the result of the check in S100 on the main program area 40 shows that the main program area 40 is abnormal (S60:NO), then in S200, the CPU 11 executes download processes.

It is noted that when the checksum result of the boot loader area 30 is abnormal (S30:NO) or when the examination of the RAM 13 shows abnormality (S50:NO), then an error process routine is started up. The error process routine notifies the user that the device needs to be replaced. Predetermined processes, such as sounding an alarm, displaying an error message on the display unit 22a, or a printing out an error message, are performed.

Figure 7:
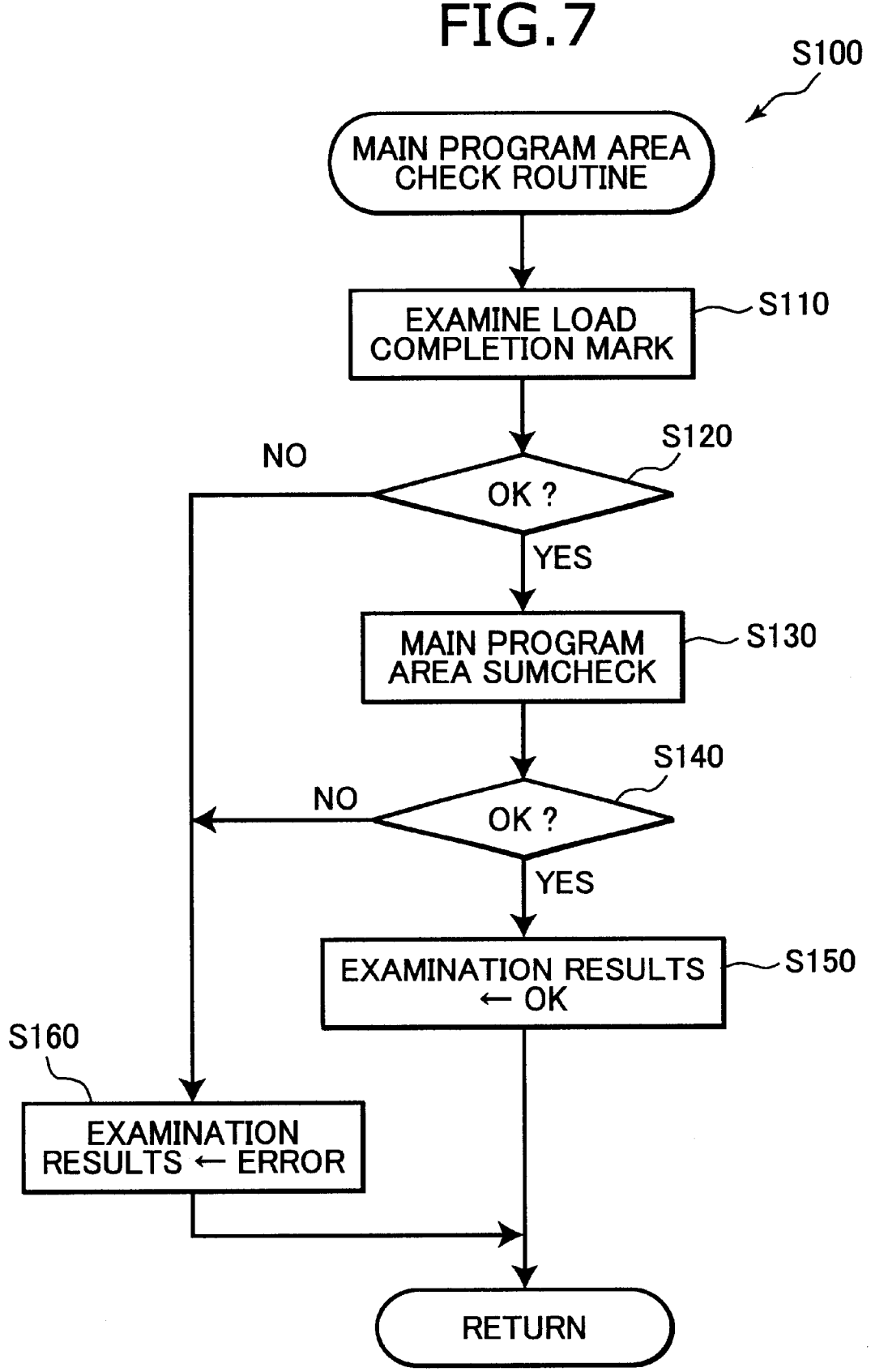
FIG. 7 is a flowchart representing a main program area check routine.

The main program area check process of S100 will be described below in greater detail with reference to FIG. 7.

First in S110, the CPU 11 investigates whether or not the load completion mark is properly stored in the load completion mark storing region 43 of the flash memory 12. When the result of this investigation indicates that the load completion mark is properly stored in the load completion mark storing region 43 (S120:YES), then in S130, the CPU 11 performs sumcheck operations on the main program area 40. That is, the CPU 11 calculates the total sum of all data stored in the main program area 40 except for data in the checksum storage region 45, and compares the calculated total value with the checksum data stored in the checksum storage region 45. When it is determined that the calculated sum total matches the checksum data stored in the main program checksum storage region 45 (S140:YES), then in S150, the CPU 11 sets an investigation result to "proper," and the program returns to the main routine.

On the other hand, when the load completion mark is not properly stored in the load completion mark storing region 43 (S120:NO) or when the result of checksum operations performed onto the main program area 40 indicates abnormality (S140:NO), then in S160, the CPU 11 sets the investigation results to "improper" or "error," and the program returns to the main routine. Based on the investigation results set in S150 or S160, the CPU 11 will judge in S60 (FIG. 6) whether to start up the downloading process routines of S200 or the main program execution routine of FIG. 11.

The download process routine of S200 will be described below with reference to FIG. 8.

When the download process routine of S200 is started up, the CPU 11 first judges in S210 whether or not the present download processes are to be executed for initial loading or for update. That is, the CPU 11 determines that the present download is for initial loading when the present process of S200 is started as a result of the negative judgement in S60. The CPU 11 determines that the present download is for update when the present process of S200 is started as a result of the affirmative judgement in S610 (FIG. 11) as will be described later. It is noted that when starting the process of S200, the CPU 11 sets information on where the process of S200 is to be executed in the entire process of FIGS. 6–11. Referring to this information, the CPU 11 performs judgement of S210. When it is determined that the present download is for initial loading, the program proceeds to S220. When it is determined that the present download is for update, the program proceeds to S310. It is noted that when the download processings of S200 are started as a result of the negative judgement in S60, then this means that the initial load has failed. Accordingly, the judgement in S210 results in that the present download process is for initial loading, and therefore the routine proceeds to S220 to again try performing the initial load operation. On the other hand, when the download processings of S200 are started in the main program execution routine of FIG. 11 as will be described later, the judgement in S210 results in that the present download process is for update, and therefore the routine proceeds to S310.

When the CPU 11 judges in S210 that the initial load is to be performed, then in S220, the CPU 11 sets an operation mode to zero (0) to indicate that the initial load is to be performed in the present download process. Also, a delete flag is set to zero (0) in order to show that no sectors in the flash memory 12 have been deleted. Afterward in S230, a data awaiting counter is set to zero (0). Then, in S240, the password collation conditions are set "not to collate". Then, the program proceeds to S250.

On the other hand, when the judgement in S210 indicates that update is to be performed during the present download process, the program proceeds to S310. Thus, processes in S310 to S330 are executed when the main program is to be downloaded as an update rather than as an initial load. When the present download is executed for the main program as an update, the operation mode is set in S310 to one (1) to distinguish the present download operations from an initial load. Also in S310, the delete flag is set to zero (0) to indicate that no sectors have been deleted from the flash memory 12. Afterward, the data awaiting counter is set to zero (0) in S320, and the conditions relating to password collation are set "to collate" in S330. Then, the program proceeds to S250.

Next in S250, the CPU 11 executes a device check to determine whether or not reading and writing operations can be properly performed onto the flash memory 12. When the results of the device check performed in S250 show that reading and writing operations can be properly performed (S260:YES), then in S400, the CPU 11 starts up a download execution routine. When the download execution routine is properly completed (S270:YES), then in S100, the CPU 11 executes the process for checking the main program area 40 in the same manner as described previously with reference to FIG. 7. When this check process shows proper results (S280:YES) then the program returns to the main routine (power on/reset routine) of FIG. 6 whereupon the main program execution routine of FIG. 11 is started up.

On the other hand, when the results of the device check process performed in S260 indicate an error or some abnormality (S260:NO), then in S340, the alarm unit 15 is operated to sound an alarm using the speaker 23 to notify the operator that defect is exist. At this time, the alarm generated by the speaker 23 is regulated to an appropriate combination of length and tone. That is, the period of time the alarm is sounded, and the tone of the alarm is adjusted into the appropriate combination. When the alarm is comprised of a successive series of alarm sounds, the period of time when each alarm sound is produced, or a silence interval between the successive series of sounds, and the tone of the sounds are adjusted into the appropriate combination. The alarm need only be sufficient to indicate the operator that the defect has been generated.

Next in S350, preparations are performed for receiving data over the parallel port 24. Then, in S360, the data awaiting counter is set to four (4). Next, data receiving processes of S800 are repeatedly executed to receive all data over the parallel port 24. The data receiving processes of S800 are repeated until data reception is terminated. It is noted that because these data reception processes of S800 are performed after a defect has been determined (S260:NO), all of the received data is deleted, and is not written into the flash memory 12.

If it is judged in S270 that the download execution routine has not been properly completed (S270;NO) or when it is judged in S280 that the results of the check routine performed on the main program area 40 show abnormality (S280:NO), then in S290, the speaker 23 of the alarm unit 15 is controlled to sound an alarm for informing download error to the user. Also at this time, the alarm generated by the speaker 23 is regulated to another appropriate combination of alarm length and alarm tone to inform the operator that download error has occurred. Afterward, the program jumps to S220 or S310 depending on the presently-set operation mode. That is, when the initial loading is to be presently performed (0), the program jumps to S220. When the update is to be presently performed (1), the program jumps to S310.

The download execution routine of S400 will be described below while referring to the flowchart in FIG. 9.

First in S410, preparations are made to enable reception of program data over the parallel port 24. Next in S420, the speaker 23 is operated to sound a notification alarm that downloading operations have been started. The speaker 23 is operated in a manner to produce a sound based on an appropriate combination of length and tone to notify the operator that the download operations have started.

Next, in S430, reception of a fixed character train is awaited. Once the fixed character train is received (S430:YES), then in S440, it is judged whether or not the operation mode is being set for executing password collation. As described above, the password collation mode has been set to "not collate" in S240 for initial loading and set to "collate" in S330 for update.

Accordingly, only when a program is being updated, the password collection mode is being set to "collate" ("yes" in S440), and the program proceeds to S450. In S450, the model/country distinguishing password is received and collated with the password stored in the region 42 of the main program area 40. If the two passwords do not match as a result of the collation (S460:NO), then in S470, the speaker 23 is operated to inform the user that the type of the main program that is presently being selected to update the resent main program is incorrect. Afterward, the data receiving processes of S800 are repeatedly executed, and all the received data is deleted and is not written in the flash memory 12. At this time, the speaker 23 is operated to produce a sound based on an appropriate combination of length and tone to inform the operator that the passwords do not match.

On the other hand, when the collation results indicate that the passwords match (S460:YES), then in S490, a process is executed for destroying data in the load completion mark storing region 43 through writing a character train different from the load completion mark into the load completion mark storage region 43. After a start record command is received in S500 (yes in S500), a single sector's worth of data is received in S510. Data in a single sector region, to be written over by the data received in S510, is deleted in S520. Then in S530, the delete flag is set to one (1) and the speaker 23 is sounded to indicate that the deleting process has been performed. In S540, the single sector's worth of data received in S510 is written in the sector that has been subjected to the deleting operation in S520. Next in S550 the speaker 23 is operated in a manner to notify the user that the single sector writing operations have been completed. Processes of S510 and subsequent processes are repeated until a complete record command is received (S560:NO).

After repeating S510 to S560 until the complete record command is received (S560:YES), then in S570 undeleted sectors remaining in the main program area 40 are deleted one sector at a time and the speaker 23 is sounded each time a sector is deleted. Thus, all the undeleted sectors are deleted. In S580, the speaker 23 is operated to notify the user that downloading operations have been completed and the program returns to the routine of FIG. 8. At this time, the download processes are properly completed. Accordingly, S270 will result in an affirmative judgement, and then the main program area check routine will be executed in S100 to judge whether or not data has been properly downloaded or not.

The processes of S800 (shown in FIGS. 8 and 9) to receive data from the parallel port 24 will be described below with referring to the flowchart in FIG. 10.

During the process of S800, a data awaiting timer is first set in S810 to a predetermined duration of time such as twelve (12) seconds. Then in S820, the CPU 11 judges whether or not received data exists. If received data is present (S820:YES), then in S830, the received data is taken into from the parallel port 24, and this routine is ended. When the process of S800 is repeatedly executed as shown in FIGS. 8 and 9, the program returns to S810.

On the other hand, if no received data exist (S820:NO), the program proceeds to S840. In S840, the CPU 11 judges whether or not the data awaiting timer has reached the time up condition. That is, the CPU 11 judges whether or not time has elapsed twelve seconds from when the data awaiting timer has been set in S810. The program waits for incoming reception data until the data awaiting timer reaches the time up condition (S840:NO).

Once the data awaiting timer reaches the time up condition (S840:YES), then in S850, the data awaiting counter is incremented by one (1). Then, in S860, the CPU 11 judges whether or not the data awaiting counter has reached a value of five (5). When the data awaiting counter does not equal five (≠5 in S860), then in S870, the speaker 23 is operated to indicate this condition to the user, and this program is ended. When the process of S800 is repeatedly executed as shown in FIGS. 8 and 9, the program returns to S810.

On the other hand, once the data awaiting counter reaches a value of five (=5 in S860), then this means that the number of the times reception data has been awaited has exceeded. Accordingly, the program proceeds to S880, in which the value presently set for the delete flag is judged. When the delete flag is being set to one (1) because some sector has been deleted from the flash memory 12 (S880: one), this means that an error has generated during the download operation. Accordingly, the download execution process is terminated and the program returns again to S220. Thus, the downloading operations are terminated due to an error. Especially when the present loading operations are for updating the program, then this means that a portion of the main program has been damaged and therefore that the multi-function device 10 will possibly not operate normally and will possibly not recover to its proper condition directly after the power is turned on. Therefore, it is preferable that the download routine be restarted quickly to download the update program again. Accordingly, the program returns to S220.

On the other hand, when the delete flag is being set to zero (0) because no sectors have been deleted from the flash memory 12 (S880:zero), then the program returns to the power on/reset routine of FIG. 6. When no sectors have been deleted, then the present condition is the same as that no downloading has started at all, so all that need to be performed is to restart the execution of the download processes from the initial stage.

The above-described data receiving process of S800 is repeatedly executed until no data is received from the parallel port 24 and data reception is waited five times. When the data waiting operation has been performed five times but no data is received, the program proceeds to S220 or to the power on/reset routine of FIG. 6 according to the present state of the memory 12.

Figure 8:
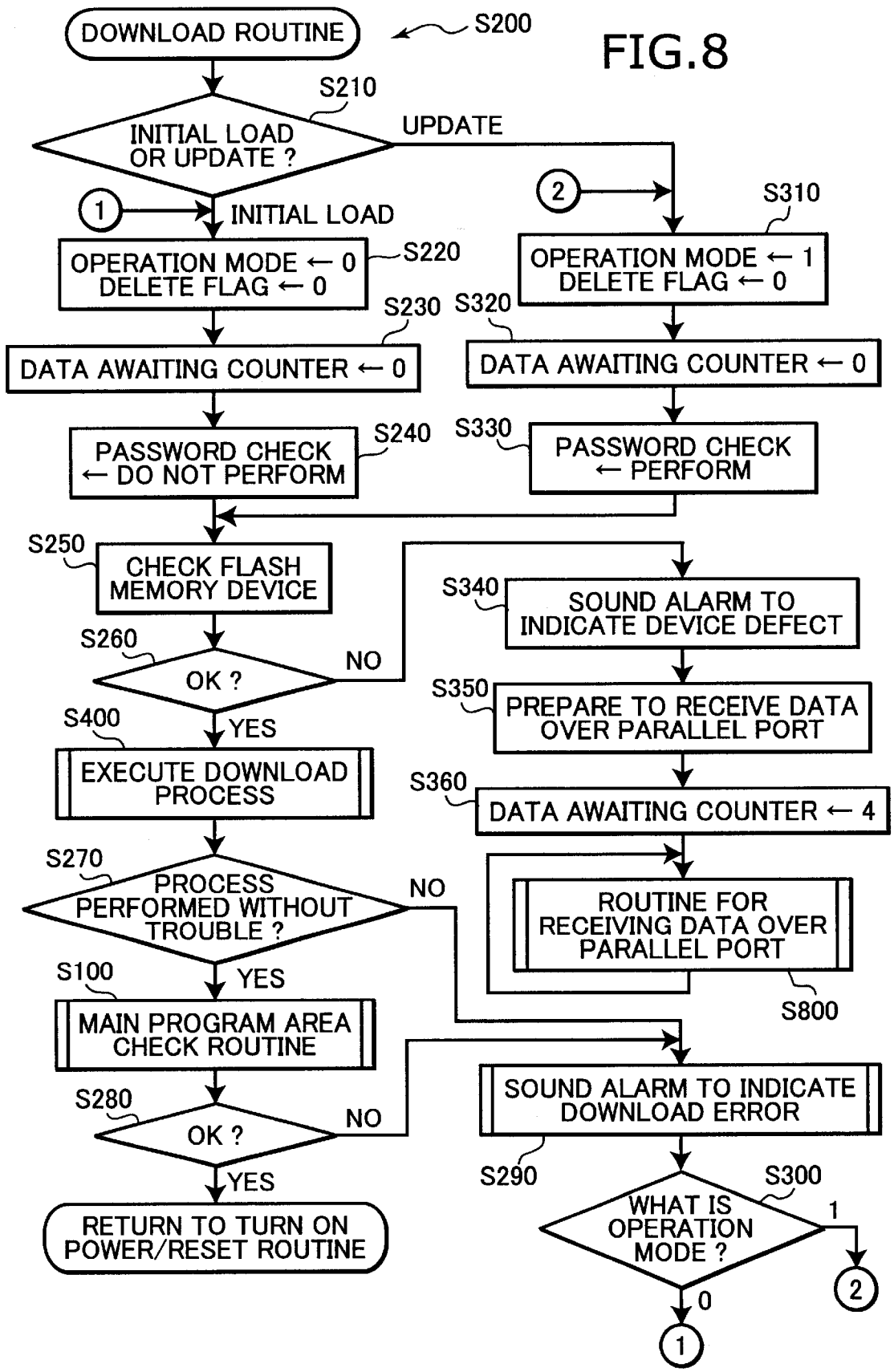
FIG. 8 is a flowchart representing a download routine.

When the data receiving process of S800 is started after S360 in FIG. 8 the data awaiting counter is always set to four (4) and the delete flag is always set to zero (0). Accordingly, when twelve seconds have elapsed after no data is received, that is, when the data waiting operation is executed once, the judgement of S860 will always result in five (5) and the judgement of S880 will result in zero (0). Accordingly, the program proceeds to the power on/reset routine of FIG. 6.

The data receiving process of S800 is also started after S470 (FIG. 9) to receive data over the parallel port 24. When no data is received, data waiting operation is performed. When the data waiting operation has been performed five times but no data is still received, because the delete flag is being always set to zero (0), the program returns to the power on/reset routine of FIG. 6.

Figure 9:
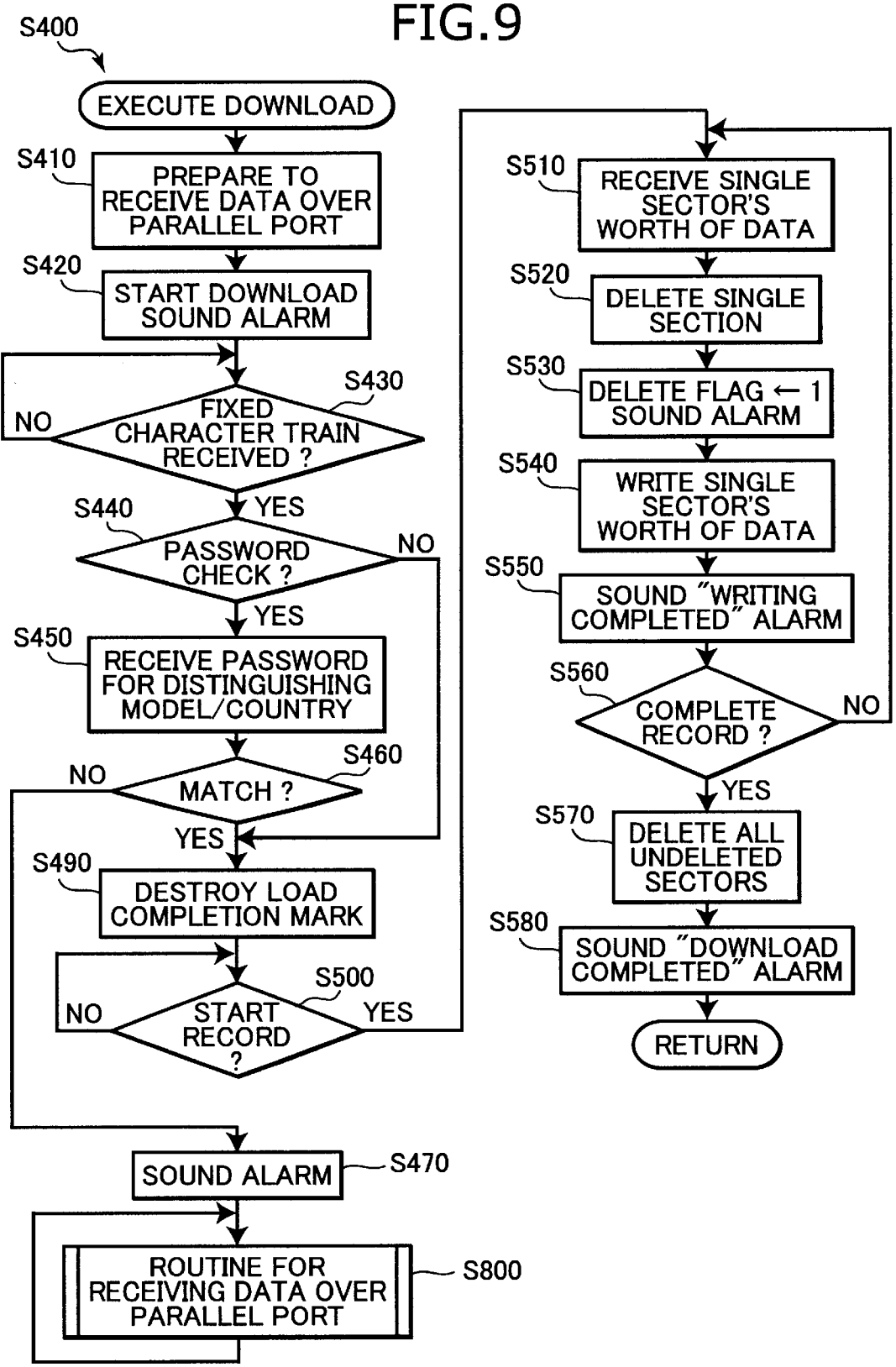
FIG. 9 is a flowchart representing a download execution routine.
Figure 10:
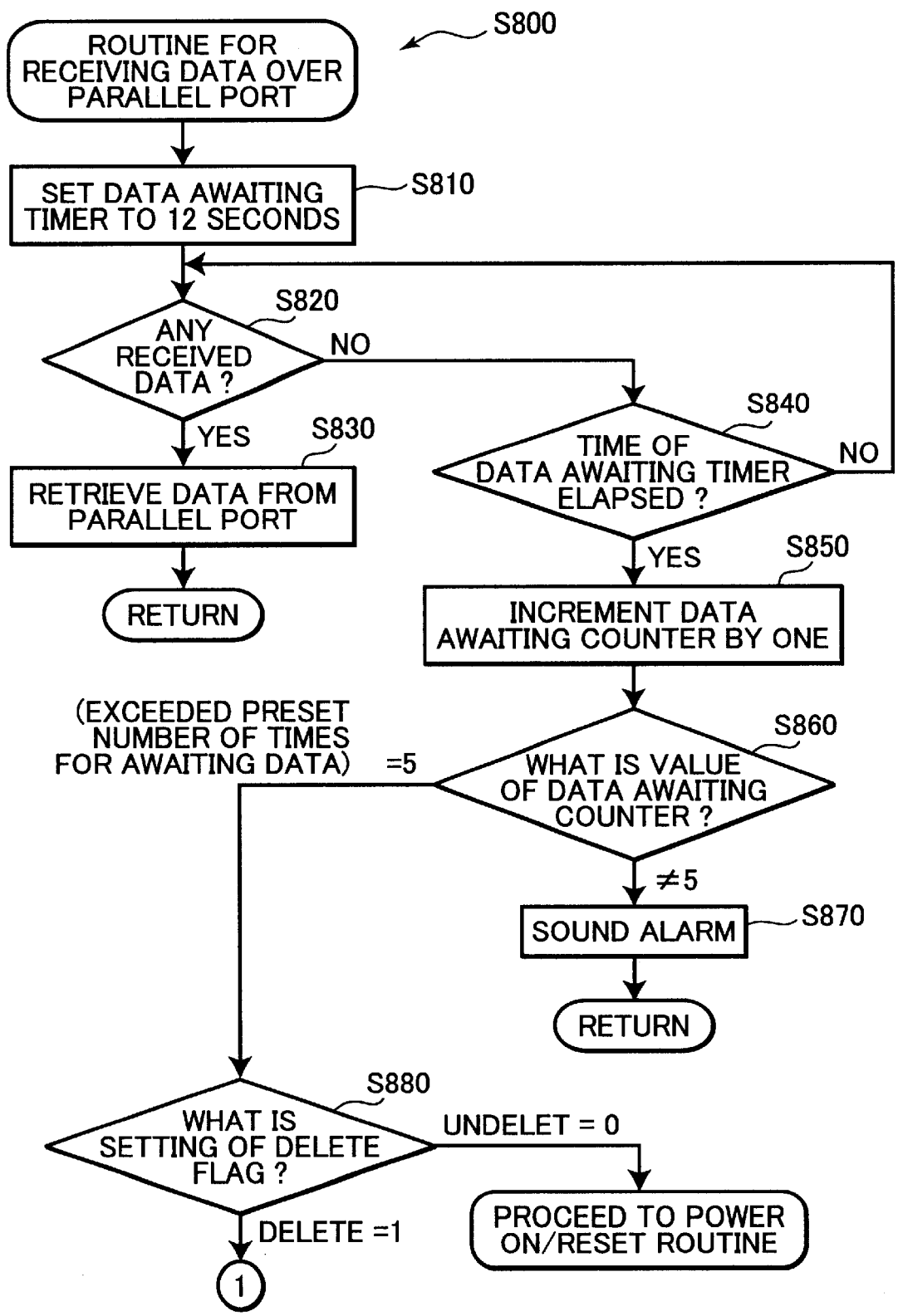
FIG. 10 is a flowchart representing a parallel port data reception routine.

It is noted that the data receiving process of S800 is executed also in each of the processes of S430, S450, S500, S510, and S560 of FIG. 9 to receive data from the parallel port 24.

The main program execution routine will be described while referring to the flowchart in FIG. 11.

During the main program execution routine, the CPU 11 first judges in S610 whether or not PLJ command has been received from an external source. When PLJ command has been received (S610:YES), then the download routine of S200 (FIG. 8) is started up. This process is executed for updating a program. During the process of S200, therefore, the present download routine is judged in S210 to be update and the processes in S310 and thereafter are executed.

On the other hand, when print data is received (S620:YES), then in S670 a print process is executed for controlling the printer unit 18 based on the received print data. When facsimile data is received over the NCU 21 and the modem 19 (S630:YES), then in S680 a facsimile reception process is performed to input facsimile data into the encoding/decoding unit 17, where the facsimile data is decoded, and to control the printer unit 18 based on the received information to print out information on a recording sheet.

If the user selects the facsimile function using the operation panel 22 (S640:YES), data is retrieved from an original document using the scanner unit 20, the data is inputted into the encoding/decoding unit 17 where it is encoded, and the resultant facsimile data is transmitted by controlling the modem 19 and the NCU 21. These processes are executed in S690. When some other functions, such as the copy machine function, is selected by the user in S650, according to the selected function, operations are executed in S700 to control the scanner unit 20, the printer unit 18 and the like according to the selected function. The above-described processes are continually executed until the power is tuned off or the multi-function device 10 is reset in S660.

As described above, according to the present embodiment, the model/country distinguishing password is included in the main program data at its trailing end as shown in FIG. 5. The password is stored in the storage region 42 in the flash memory 12 during the initial loading process. When the main program is updated with an update main program, the multi-function device 10 will receive a model/country distinguishing password for the update main program before receiving the body of the program data. Accordingly, the multi-function device 10 compares the received password with the stored password before executing the download process. Accordingly, it is possible to prevent the multi-function device 10 from downloading an update program for a country and model different from those of the already-stored program.

During the initial loading process, the multi-function device 10 is set to the operation mode not to compare a received password with an already-stored password. It is therefore possible to download a program for any country and for any model type into the flash memory 12 that has been produced in common for any country and for any model.

According to the present embodiment, the predetermined character train is included in the trailing end of the main program data as the load completion mark. When the main program is downloaded to the multi-function device 10, the load completion mark is stored in the storage region 43 in the flash memory 12. In order to judge whether the main program is properly stored in the flash memory 12, not only the checksum operation is performed in S130, but also it is examined in S110 whether or not the load completion mark is properly stored in the region 43. Though the calculated total sum will possibly match the checksum value accidentally, the examination process of S110 can ensure that the main program area check process of S100 be performed properly.

The load completion mark is destroyed in S490 before the main program data is downloaded as update. Because the load completion mark is located in the trailing end of the program data, the load completion mark will not be stored when the downloading operation is terminated in error and the program data is not completely downloaded. Accordingly, it is possible to accurately judge, through examining the load completion mark in S110, whether or not the downloading operation is properly completed.

According to the above-described embodiment, when the boot loader program, stored in the boot loader program storage region 31, is executed in FIGS. 6–11 to initially load a main program into the main program storage region 41 or to update the main program stored in the main program storage region 41, then at each load process step from when the download of the main program is started until the downloading has been completed, that is, in S290. S340, S420, S470, S530, S550, S570, S580, and S870, the alarm unit 15 is operated to emit sound from the speaker 23 as a different combination of sound length and sound tone. The sound length is defined as a period of time when the sound is produced. Alternatively, when the speaker 23 is designed to produce a successive series of sounds for each step, the sound length is defined as a period of time when each sound is produced or as a silence interval between the successive series of sounds. The sound tone is defined as a level of the tone. Thus, each step can be reliably notified to the user according to the different sound form. The multifunction device 10 therefore uses the speaker 23 to notify the user of the status of operations for downloading the main program. The user can know the status of downloading operations based on the sound of the alarm. Accordingly, the user can accurately know the download condition of the main program.

Because the multi-function device 10 notifies the operator of the downloading condition using combinations of the length and tone of sound, the operator can accurately know the downloading status even if he/she is slightly separated from the data storage device.

It is noted that in order to notify the user about the condition of the downloading operations by combining the length and tone of the alarm, the length and tone can be altered according to whether the load operations are successfully performed or whether the load operations had generated an error. For example, the tone and the time period when the sound is produced or the silence interval between the successive sounds can be altered according to whether or not the loading operations are successfully performed. This enables the user to accurately know whether the main program is being properly downloaded or an error is generated during the downloading operations.

It is noted that when a main program is downloaded or updated using the general boot loader, deletion and writing of a plurality of blocks or sectors in the flash memory 12 is performed. When the plurality of blocks are deleted or rewritten, time is required to delete, to write, to transmit data, and to perform other processes. Normally, several minutes are required to completely download or update a main program to the flash memory. According to the present embodiment, the speaker 23 notifies the operator of the condition of the download processes while the main program is being downloaded. Accordingly, while the downloading processes are being performed, the operator accurately knows whether the processes are being properly performed.

The multi-function device 10 can accurately advise the operator of the download condition by performing an external notification to the operator of the download process condition using different forms corresponding to the download process condition at each different download process step from the start of download to the completion of download when program data is being initially loaded or updated through the downloading processes into the rewritable nonvolatile memory 12.

In the above description, the speaker 23 is designed to audibly notify the user of the download process steps. However, other various modifications can be provided. For example, the display 22a on the operation panel 22 may be controlled to indicate the download condition through changing a display status for each download step.

Second Embodiment

A multifunction device according to a second embodiment of the present invention will be described with reference to FIGS. 12 and 13.

In the first embodiment, during the updating process, the received model/country password is compared with the model/country password already stored in the region 42. The received password indicates the specifications (model/country) of the main program to be downloaded. The stored password indicates the specifications (model/country) of the already-stored main program, and therefore indicates the present specifications of the multi-function device 10. As long as the received password matches the stored password, the program data can be updated. Because of this, the stored program data can be prevented from being rewritten or exchanged with programs for different specifications, that is, for different countries or different model types. When the received password does not match the stored password, the program can not be updated.

It is, however, desirable that the multi-function device 10 be designed so that the program data can be updated regardless of its specification and therefore that the multi-function device 10 can be easily and flexibly changed to different specifications. That is, it is desirable that the multi-function device 10 can be intentionally downloaded with program data for other countries, thereby being changed to be used for other countries. It is desirable that the multi-function device 10 can be intentionally downloaded with program data for other model types, thereby being changed into other model types.

According to the second embodiment, the multi-function device 10 is designed as capable of being intentionally and flexibly changed into different specifications through intentionally writing update program data over already-stored program data regardless of whether the password attached to the update program data matches the already-stored password.

According to the present embodiment, the user can set a predetermined change mode through operating a predetermined combination of keys on the operation panel 22. As will be described later, when the main program is being already stored in the flash memory 12 together with its model/country password, if another main program with its model/country password is transmitted, during the change mode, from the personal computer PC over the parallel I/F unit 16, then the received main program can be written over the already-stored main program without first judging whether the transmitted password matches the already-stored password or even when the two passwords are judged not to match.

Figure 12:
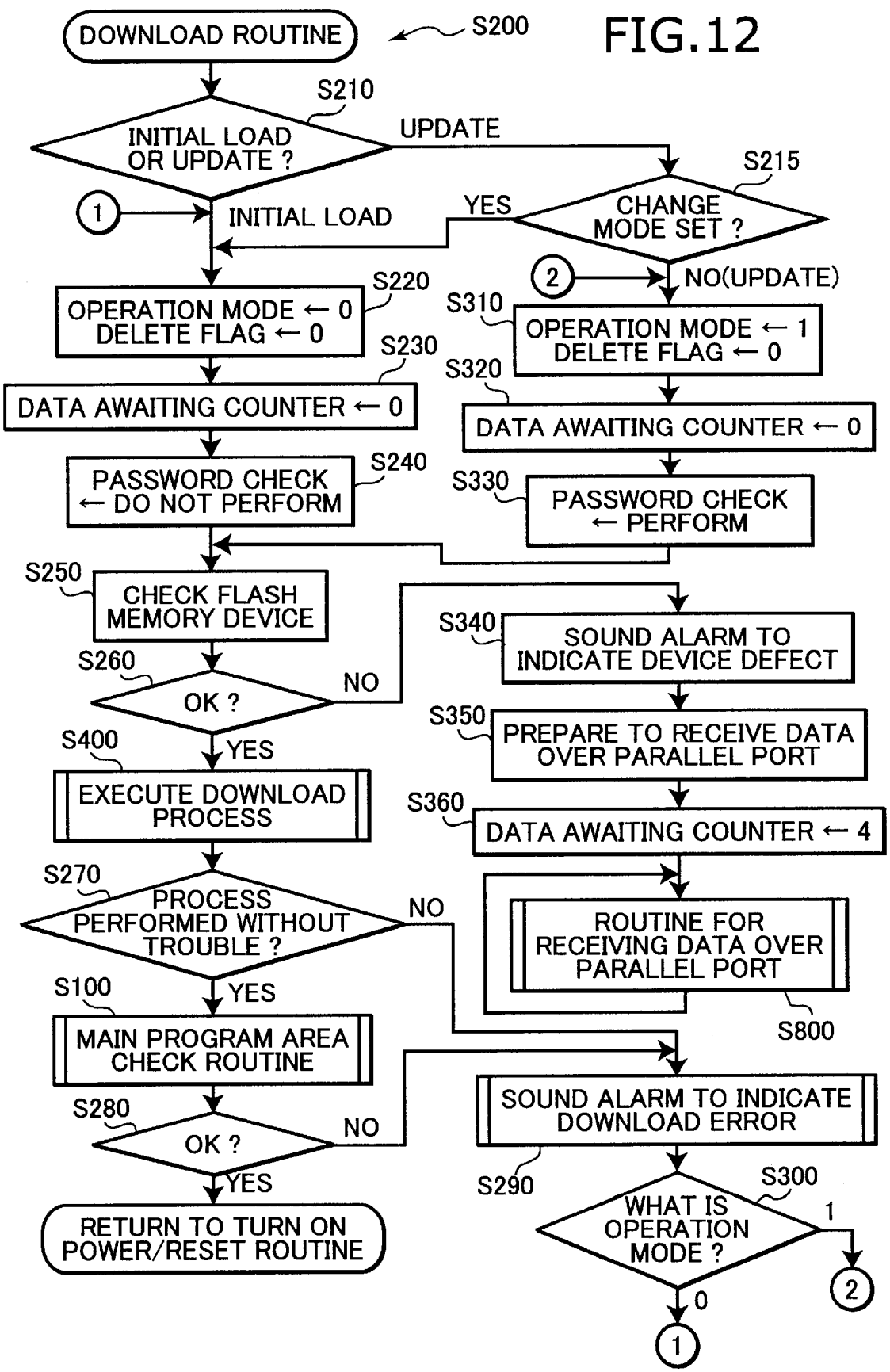
FIG. 12 is a flowchart representing a download routine according to a second preferred embodiment.
Figure 13:
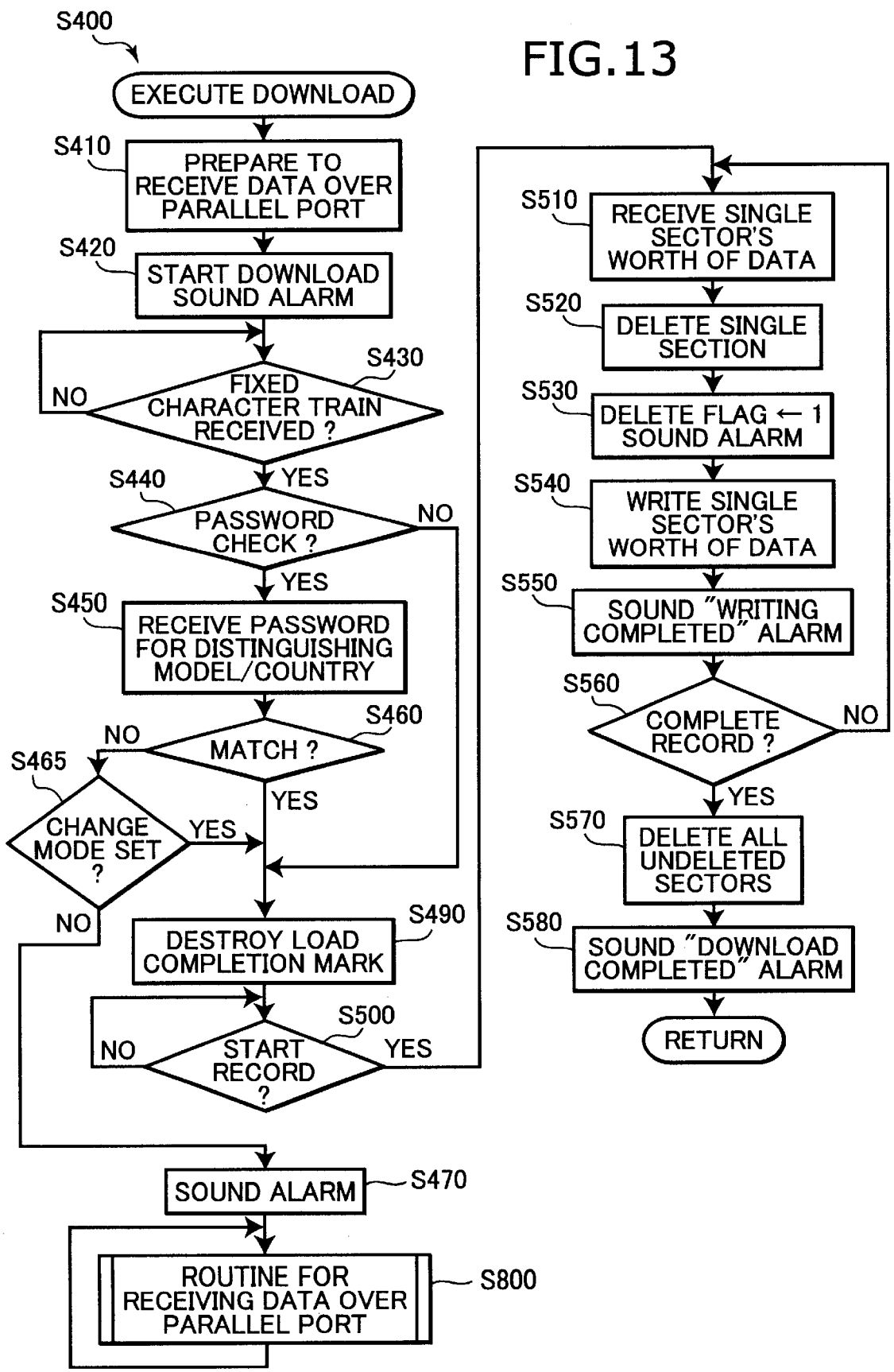
FIG. 13 is a flowchart representing a download execution routine according to the second embodiment.

The multi-function device 10 of the present embodiment operates in the same manner as that of the first embodiment except that the multi-function device 10 of the present embodiment executes the download routine of S200 as shown in FIG. 12 and executes the download execution routine of S400 as shown in FIG. 13.

The download routine of S200 shown in FIG. 12 is the same as that of the first embodiment shown in FIG. 8 except that a process of S215 is added during the download routine of FIG. 12.

According to the present embodiment, as shown in FIG. 12, when the download routine of S200 is started, the CPU 11 first judges in S210 in the same manner as in the first embodiment whether the present download is for initial loading or for update. When the CPU 11 judges that the present download is for initial loading, the program proceeds to S220. On the other hand, when it is judged that the present download is for update, the CPU 11 further judges in S215 whether or not the change mode has been set by the user through depressing the predetermined combination of various keys of the operation panel 22. When the change mode has been set (S215:YES), the program proceeds to S220 to perform a program for downloading the main program without referring to the password in the same manner for the initial loading. On the other hand, when the change mode is not set (S215:NO), then the program proceeds to S310 to update the main program while referring to the password in the same manner as in the first embodiment. In S310 through S330, therefore, the operation mode is set to one (1) in order to designate the normal update mode, and the condition related to the password collation is set "to collate".

On the other hand, when it is judged in S210 that the present downloading process is the initial loading process and that downloading has not been completed previously (S210:initial load), then the operation mode is set to zero (0) in order to designate the initial loading, and the condition related to the password collation is set "not to collate" in the same manner as in the first embodiment. Similarly, when it is judged in S210 that the present downloading process is the update process and that downloading has been performed previously (S210: update) and it is judged in S215 that the change mode is being set (S215:YES), then the operation mode is also set to zero (0) in order to designate the change mode, and the condition related to the password collation is set "not to collate".

The download execution routine of FIG. 13 is the same as that of FIG. 9 in the first embodiment except that a process of S465 is added to the download execution routine of FIG. 13.

It is noted that the CPU 11 judges in S440 whether or not to collate the received model/country password with the password stored in the storage region 42 according to the presently-set mode related to the password collation. The mode "not to collate" has been set in S240 for the initial loading or for the update loading during the change mode. The mode "to collate" has been set in S330 for the normal update loading. Accordingly, during initial load processes or during the change mode for the updating process (no in S440), S490 and the subsequent steps are directly executed to download the main program without receiving the password for distinguishing the model and the country. Particularly, when the change mode is being set for the update process. the main program is downloaded without collating passwords so that the multi-function device 10 can be flexibly changed to different specifications.

On the other hand, during the normal update process without the change mode being set (yes in S440), the password is received and collated with the password stored in the region 42 in S450 and S460. When the received password matches the stored password (yes in S460), the received program data is written over the already-stored program data through the processes of S490–S580.

On the other hand, when the received password does not match the stored password (no in S460), the CPU 11 judges in S465 whether or not the change mode is presently being set. When the change mode is being set (S465:YES), then the program proceeds to S490. Then, the received program data is written over the already-stored program data through S490 and subsequent steps. Accordingly, specifications of the multi-function device 10 can be changed.

On the other hand, when the change mode is not being set (S465:NO), then the speaker 23 is sounded in S470 to notify the user that the selected update main program is incorrect, and the received data is deleted and is not written in the flash memory 12 in the same manner as in the first embodiment.

Thus, when the passwords do not match (no in 5460), the CPU 11 again determines in S465 whether or not the change mode is being set. When the change mode is being set, S490 and on of the download processes are executed so that even when the passwords do not match, the main program is downloaded during the change mode so that specifications of the multi-function device 10 can be flexibly changed.

During the updating processes, if the change mode is not being set, only when the received password matches the stored password (yes in S460), the received program data is written over the already-stored program data through the processes of S490–S580. Accordingly, only when the received program data is for the same country and of the same model type with the program data already stored in the flash memory 12, the received program data is written over the already-stored program data.

As described above, according to the present embodiment, the change mode can be set by the user through pressing the predetermined combination of the keys provided to the upper surface of the operation panel 22. During the change mode the CPU 11 does not compare a password transmitted from the personal computer PC over the parallel port 24 and the parallel I/F unit 16 with the password already stored in the password storage region 42. The CPU 11 does not judge whether or not these passwords match (S440:NO). The CPU 11 directly executes the downloading operation from S490 to S580. That is, the main program storage region 41 is directly brought into a rewritable condition so that the main program can be rewritten in the main program storage region 41. Alternatively, even when the CPU 11 compares the two passwords and judges that the two passwords do not match (S460:NO), if the change mode is being set (S465:YES), the main program storage region 41 is brought into the rewritable condition so the main program can be rewritten in the main program storage region 41. That is, the CPU 11 executes the downloading operation from S490 to S580. Accordingly, during the change mode, regardless of whether or not the password received from the personal computer PC matches the password already stored in the password storage region 42, the main program received from the personal computer PC is written over the main program in the main program storage region 41.

Accordingly, during the change mode, the main program can be updated in the flash memory 12 regardless of whether the model/country password transmitted from the personal computer PC matches the model/country password stored in the flash memory 12. Accordingly, specifications of the multi-function device 10 can be flexibly changed into intentionally different specifications.

As described above, according to the present embodiment, when the change mode is not being set, when the password (specification indication data) is received by the parallel I/F unit 16 over the parallel port 24, the password is collated with the password already stored in the storage region 42. When the result of the collation indicates that the two passwords match, then the program data storage region 41 is rewritten by the update program data received also by the parallel I/F unit 16 over the parallel port 24. In contrast with this, when the change mode is being set, the two passwords are not collated. Even when the two passwords are collated and it is judged that the two passwords do not match, the program data storage region 41 will be written by the received update program data.

Thus, while the change mode is not being set, only when the password prestored in the storage region 42 matches the received password, the program data storage region 41 is rewritten with the program data received together with the password. On the other hand, while in the change mode regardless of whether the password stored in the storage region 42 matches the received password, the program data storage region 41 is rewritten with the received program data. Accordingly, when updating the program data in the flash memory 12 that stores the password indicating the specifications of the multi-function device 10, regardless of whether the received password matches the password stored in the memory 12, the program data can be updated and the multifunction device 10 can be flexibly changed intentionally to a device having different specifications.

Third Embodiment

A multi-function device according to a third embodiment of the present invention will be described below with reference to FIG. 14.

According to the present embodiment, the multi-function device 10 is designed as capable of updating the program data, stored in the flash memory 12, as needed even when the multi-function device 10 operates as a printer in S670 (FIG. 11) and is in a print disabling condition. That is, the parallel I/F unit 16 is prohibited from outputting predetermined control signals such as busy signals and paper empty signals to the personal computer PC. Thus, the user can control the personal computer PC to transmit his/her desired update program data to the multi-function device 10 whenever he/she desires.

According to the present embodiment, by pressing a predetermined combination of the keys on the operation panel 22, a predetermined prohibition mode can be set to the multi-function device 10 so that the multi-function device 10 be prohibited from outputting a busy signal or a paper empty signal to the personal computer PC.

Figure 14:
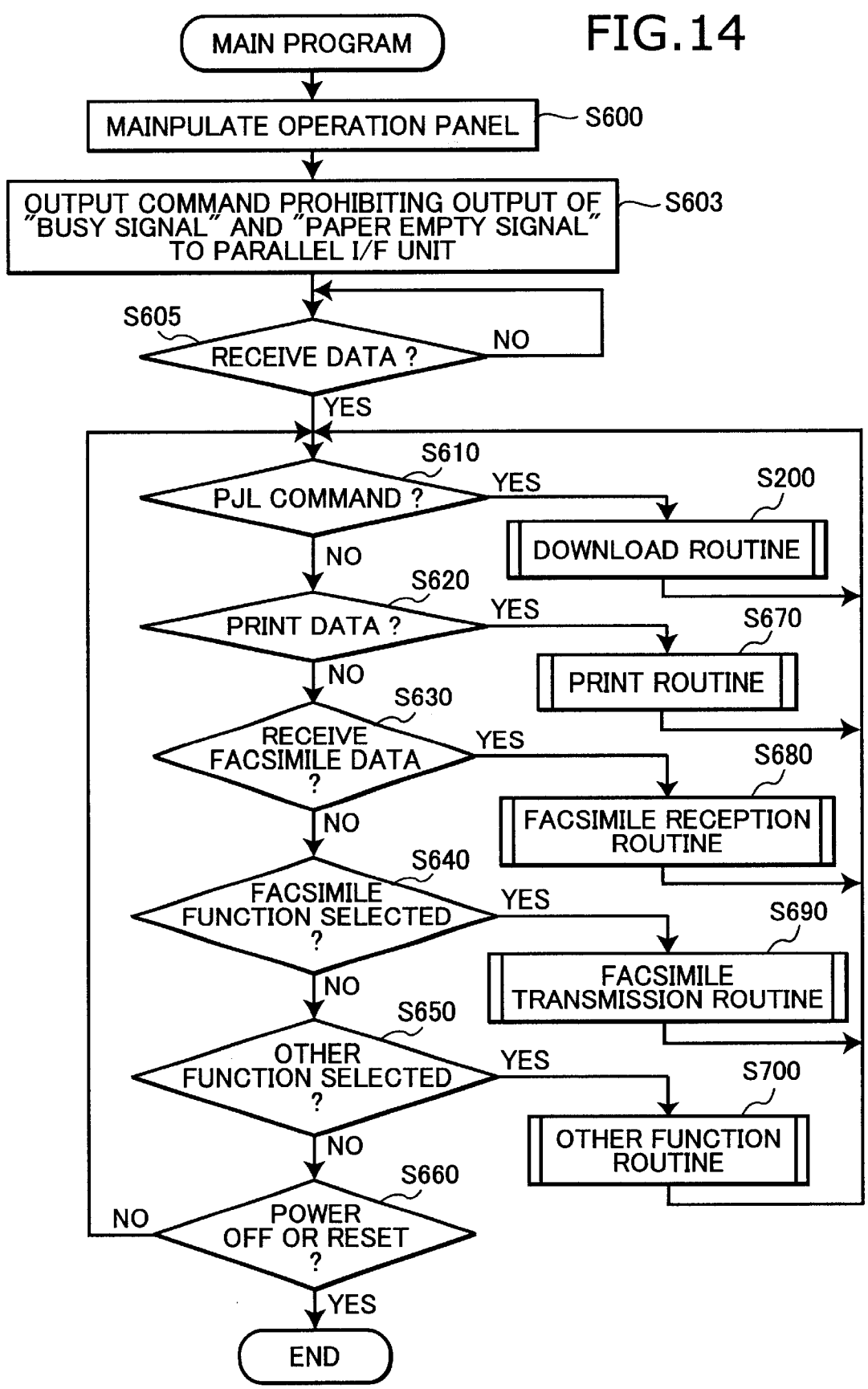
FIG. 14 is a flowchart representing execution of a main program according to a third preferred embodiment.

The operation of the multi-function device 10 of the present embodiment is the same as that of the first embodiment except that the main program execution routine is performed as shown in FIG. 14.

The main program execution routine of FIG. 14 is the same as that of the first embodiment shown in FIG. 11 except that processes of S600 through S605 are added in the routine of FIG. 14.

During the main program execution routine of FIG. 14, the operation panel 22 is first operated by the user in S600. Based on the predetermined combination of the pressed keys the prohibition mode is set to the multi-function device 10. As a result, in S603, the CPU 11 supplies the parallel I/F unit 16 with an instruction to prohibit the parallel I/F unit 16 from transmitting a busy signal and a paper empty signal over the parallel port 24 to the personal computer PC. The busy signal indicates that the multi-function device 10 is in the middle of printing operation. The paper empty signal indicates that the multi-function device 10 has run out of paper.

Because the multi-function device 10 is thus prohibited from outputting a busy signal and a paper empty signal, regardless of whether the multi-function device 10 is printing or not, the personal computer PC can transmit program data to be downloaded to the flash memory 12 as needed.

Next in S605, the CPU 11 determines whether or not data has been received from the personal computer PC. Once data has been received (S605:YES), then the processes of S610–S660 are executed in the same manner as in the first embodiment. For example, when print data is received (yes in S620), the printing operation is executed in S670. Because the multi-function device 10 is prohibited from transmitting the busy signal and the paper empty signal to the personal computer PC, the personal computer PC can transmit the PJL command and program data to the multi-function device 10 whenever the user desires. When the PJL command is received (yes in S610), the download process (update process) is executed in S200. During the download process of S200, the main program storage region 41 of the flash memory 12 is updated based on the main program data which is transmitted from the personal computer PC after the PJL command.

Accordingly, even when the multi-function device 10 is unable to print based on new information, the multi-function device 10 can be prohibited from outputting a busy signal and a paper empty signal to the personal computer PC. Therefore, even when the multi-function device 10 is incapable of printing new data, the main program stored in the main program storage region 41 of the flash memory 12 can still be updated. The user of the multi-function device 10 can update the multi-function device 10 whenever he/she desires.

As described above, according to the present embodiment, the operation panel 22 can be operated in S600 to set the prohibition mode. During the prohibition mode, in S603, the multi-function device 10 is prohibited from transmitting a busy signal and a paper empty signal over the parallel I/F unit 16 and the parallel port 24 to the personal computer PC. Accordingly, the multi-function device 10 does not output the busy signal or the paper empty signal. Accordingly, regardless of whether the multi-function device 10 is capable of printing or not, the main program can be transmitted from the personal computer PC to the multi-function device 10 to be downloaded therein. By executing update operations in the download processes in S200 in this condition, the main program transmitted from the personal computer PC can be downloaded into the main program storage region 41 of the flash memory 12 as an update program.

Accordingly, when the multi-function device 10 is unable to print based on new data, the multi-function device 10 is prohibited from sending busy signals and paper empty signals to the personal computer PC so that even when the multi-function device 10 is in a condition where it can not print based on new data, the main program stored in the main program storage region 41 of the flash memory 12 can be updated as necessary.

As described above, according to the present embodiment, the multi-function device 10 serving as the printer device is prohibited from transmitting to the personal computer PC the predetermined signals, such as busy signals and paper empty signals. More specifically, the CPU 11 outputs a prohibition signal to the parallel I/F unit 16, whereupon the parallel I/F unit 16 will not output the predetermined control signals. Therefore, regardless of whether the printer 10 is in condition where it can or can not print, the personal computer PC (external transmission device) is in a condition that can transmit control signals, such as program data, to the printer 10. Then, the updating operation is achieved in S200 to rewrite the memory 12 of the printer 10 based on the program data transmitted from the personal computer PC.

Fourth Embodiment

A multi-function device according to a fourth embodiment of the present invention will be described with reference to FIGS. 15 through 18.

The multi-function device 10 of the present embodiment is designed as capable of updating also the boot loader program, for controlling operations of loading the main program, while reliably preventing the boot load program area from being erroneously rewritten without troublesome hardware measure. More specifically, the multi-function device 10 is designed as allowing rewrite of the loader program storage region 30, according to loader program data transmitted from the personal computer PC, only when the multi-function device 10 is set to a rewrite mode.

According to the present embodiment, a flash memory rewrite mode key is provided on the operation panel 22 for inputting the user's instruction to set the multi-function device 10 into a mode for rewriting the flash memory 12. A rewrite mode for enabling rewrite of the boot loader program storage region 31 can be set and changed by the user through depressing an appropriate combination of the keys on the operation panel 22.

It is noted that the boot loader program has the same configuration as the main program (FIG. 5) except that the boot loader program does not include the model/target country password.

Figure 15:
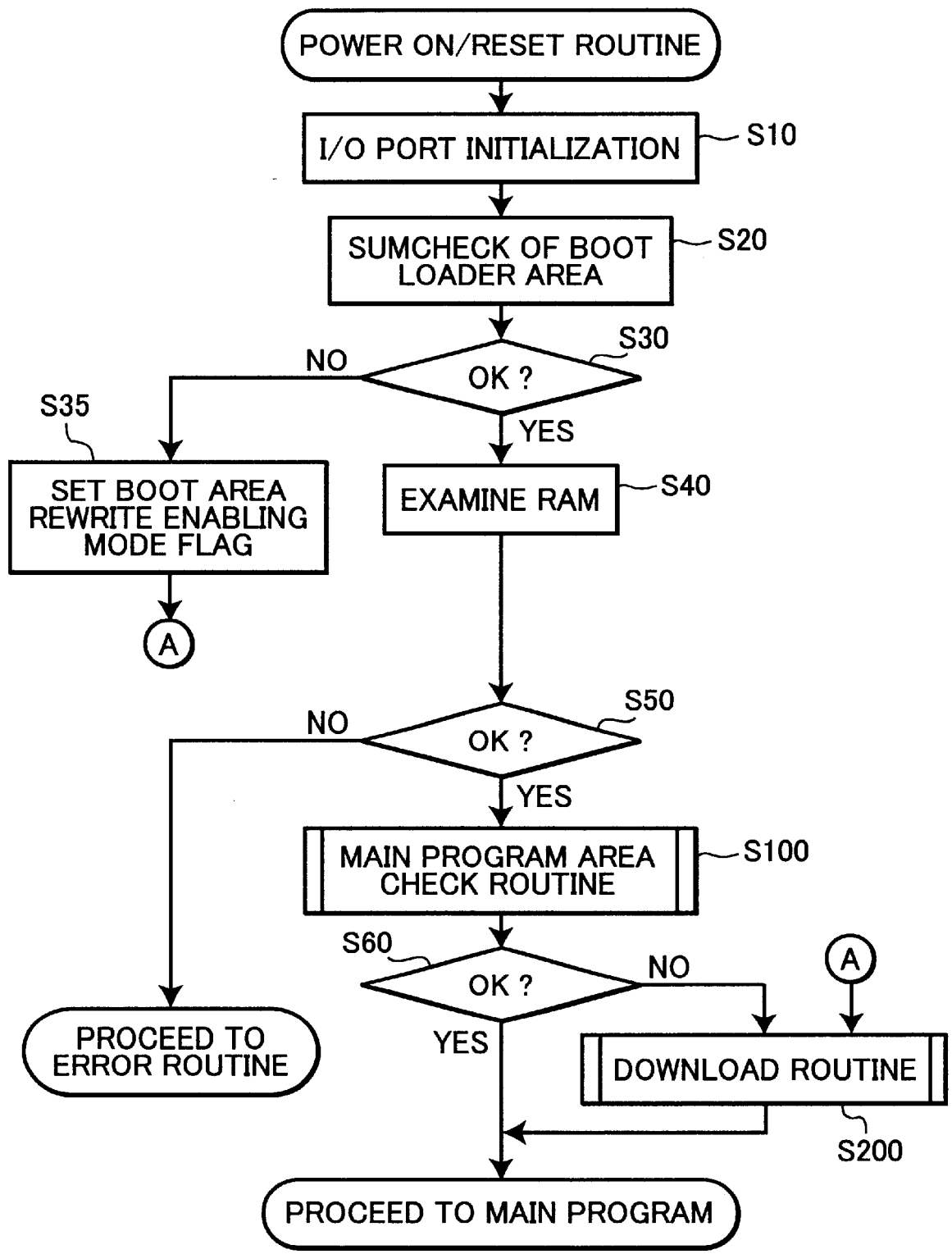
FIG. 15 is a flowchart representing operations performed when the multi-function device is turned on or reset according to a fourth preferred embodiment.
Figure 16:
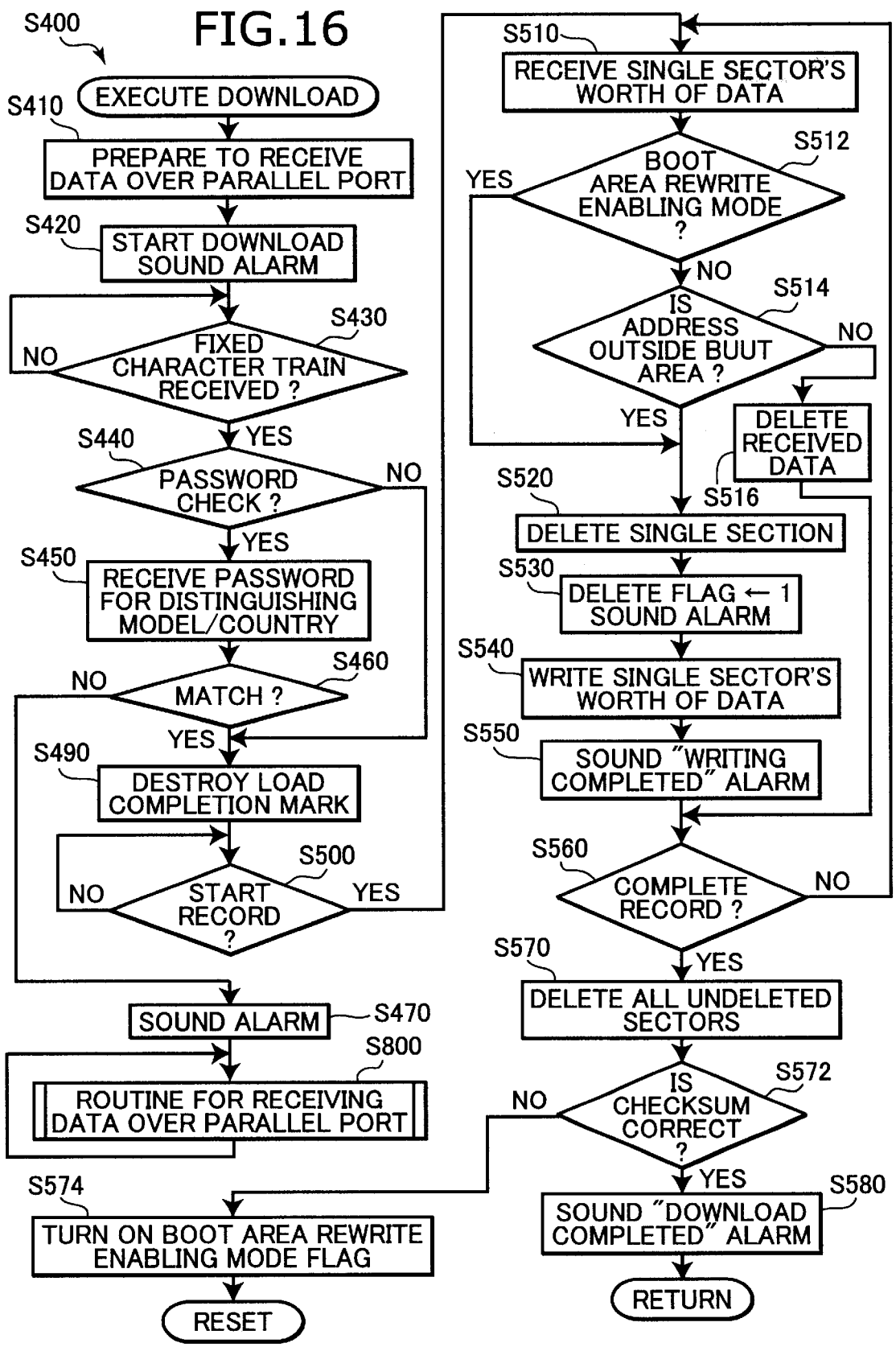
FIG. 16 is a flowchart representing a download execution routine according to the fourth embodiment.
Figure 17:
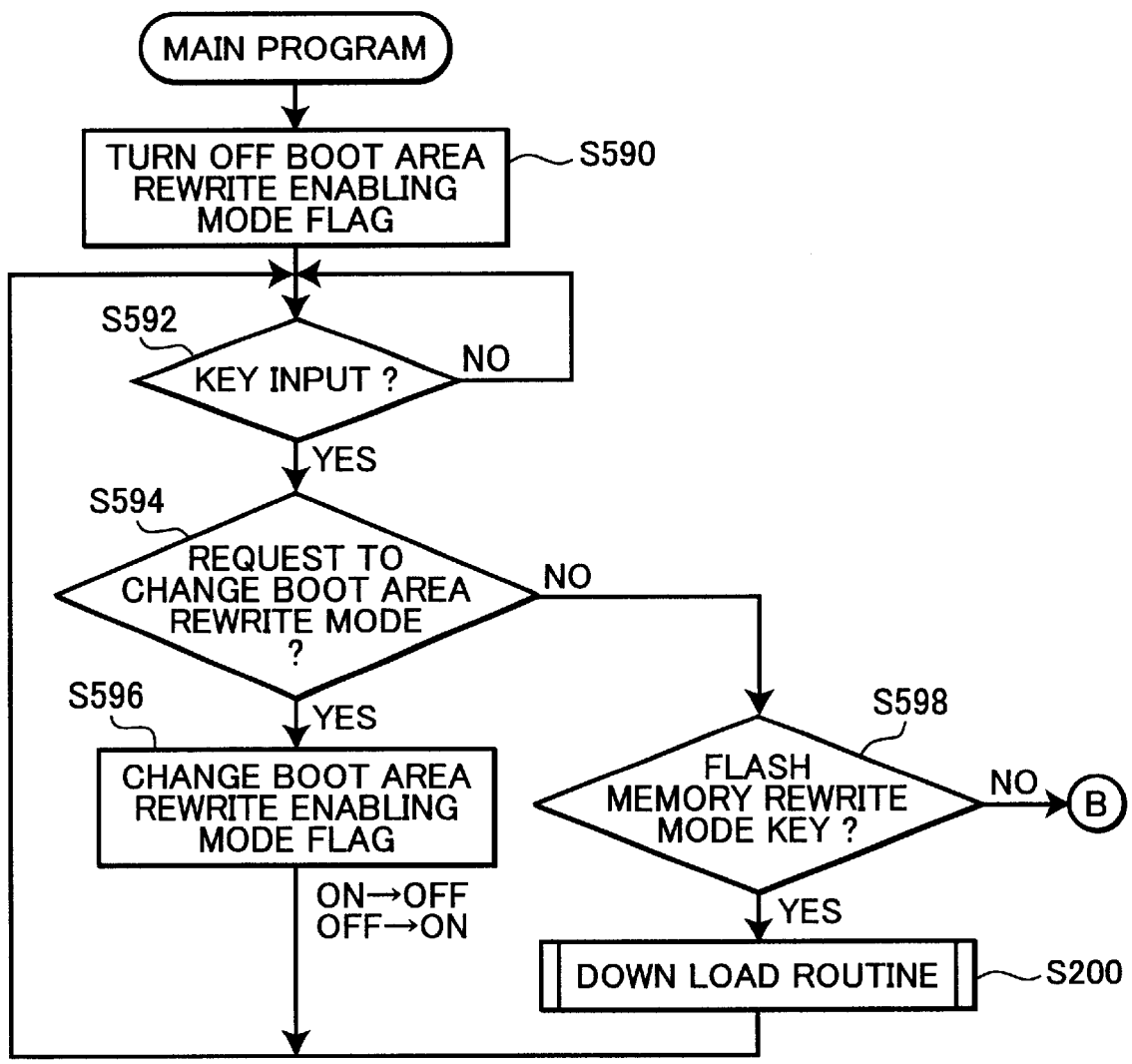
FIG. 17 is a flowchart representing a part of an execution of a main program according to the fourth embodiment.
Figure 18:
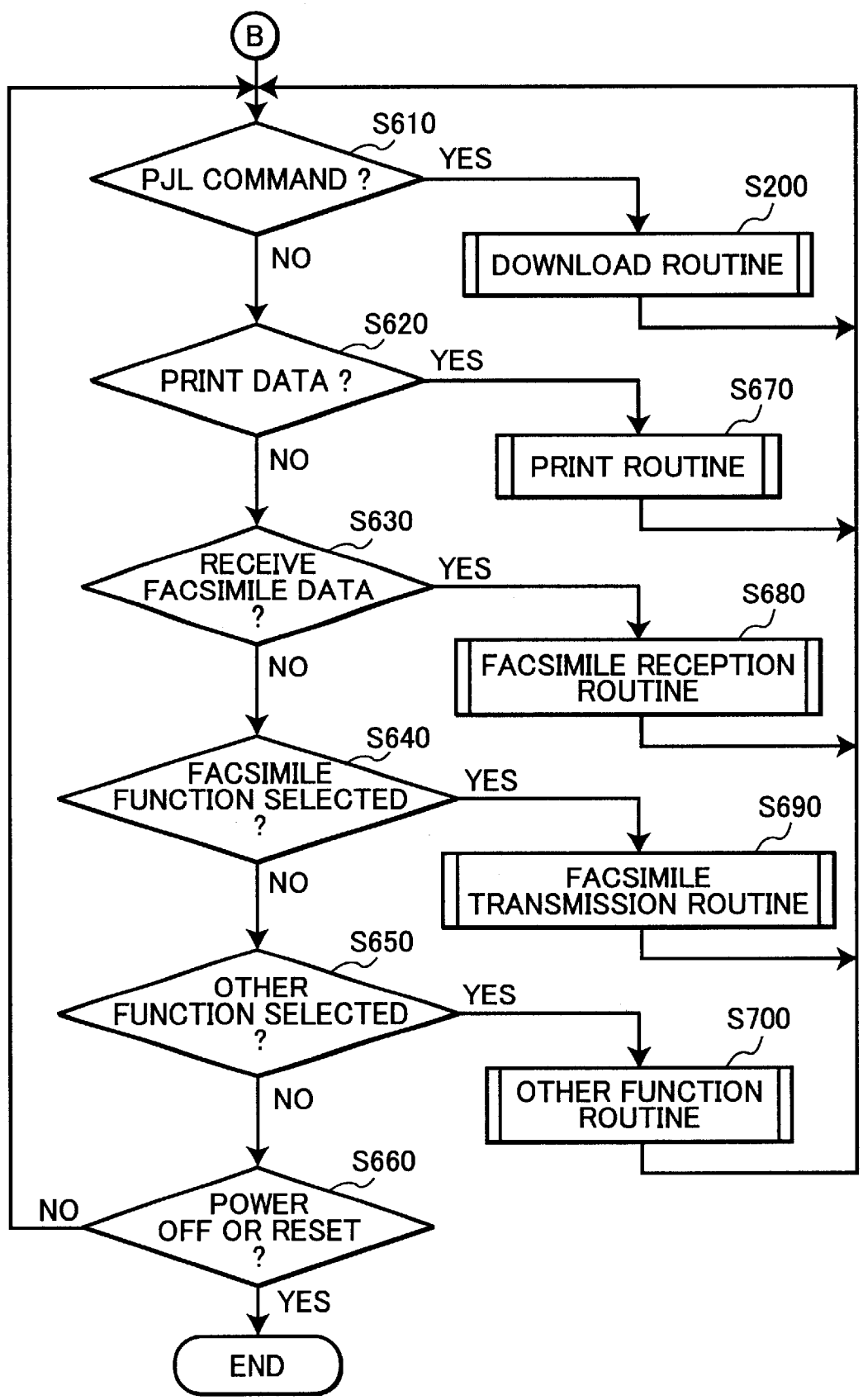
FIG. 18 is a flowchart representing a remaining part of the execution of the main program according to the fourth embodiment.

The multi-function device 10 of the present embodiment operates in the same manner as in the first embodiment except that the power on/reset routine is executed as shown in FIG. 15, that the download execution routine of S400 is executed as shown in FIG. 16, and that the main program execution routine is executed as shown in FIGS. 17 and 18.

The power on/reset routine of FIG. 15 is the same as that of the first embodiment shown in FIG. 6 except that processes of S35 are added in the routine of FIG. 15.

That is, when sumcheck results of the boot loader area 30 are abnormal (S30:NO), then in S35, a boot area rewrite enabling mode flag is set to ON and afterward the program proceeds to the downloading process of S200.

When the download routine of S200 (FIG. 8) is executed after the process of S35, the download routine of S200 is executed to download loader program data transmitted from the personal computer PC. It is noted that in S210, the CPU 11 determines that the present download of S200 is for initial loading when the process of S200 is executed as a result of the negative determination of S60 and also when the process of S200 is executed while the boot area rewrite enabling mode flag is being set to ON. The CPU 11 determines that the present download is for update when the CPU 11 determines that the present download is not for initial loading. Accordingly, when the process of S200 is executed as a result of S35, because the boot area rewrite enabling mode flag is being set to ON, the CPU 11 determines in S210 that the present download is for initial loading. Accordingly, in this case, the conditions relating to password collation are set "not to collate" in S240.

During the process of S200, the process of S400 is executed as shown in FIG. 16. During the process of S400 of FIG. 16, not only the main program area 40 but also the boot loader area 30 can be rewritten by a transmitted program.

The download execution routine of S400 shown in FIG. 16 is the same as that of the first embodiment shown in FIG. 9 except that S512 through S516 are added and that S572 and S574 are added.

It is noted that when the boot area rewrite enabling mode flag has been set to ON and therefore the conditions relating to password collation have been set "not to collate" in S240 (FIG. 8), the judgement process of S440 will result in negative determination and will directly proceed to S490 without collating passwords.

When a single sector's worth of data is received in S510, the CPU 11 judges in S512 whether or not the multi-function device 10 is being set in the boot area rewrite enabling mode through examining whether or not the boot area rewrite enabling mode flag is set to ON or not. If the boot area rewrite enabling mode flag is OFF and therefore the device 10 is not in the boot area rewrite enabling mode (S512:NO), then in S514, the CPU 11 determines whether or not address data included the received data has an address outside of the boot area 30. If the address data is inside the boot area (no in S514), then in S516, the received data is deleted and is not written in the flash memory 12. Then, the program proceeds to S560.

On the other hand, when the boot area rewrite enabling mode flag is set to ON and therefore the device 10 is in the boot area rewrite enabling mode (S512:YES) or when the device 10 is not in the boot area rewrite enabling mode but the received data has an address outside the boot area (S514:YES), then the program proceeds to S520. During the processes of S520 and so on, the received data is written into the flash memory 12 at a corresponding area. That is, when the main program data is received, the main program data is written in the data storage area 40 through repeatedly executing the processes of S520–S560 in the same manner as in the first embodiment. When the boot loader program data is received, the boot loader program data is written in the data storage area 30 through repeatedly executing processes of S520–S560 in the same manner as for the main program data.

After all the memory area is rewritten with the received program data through processes of SS10–S560 and S570, the CPU 11 judges in S572 whether or not the checksum is appropriate for the region 30. When the checksum is not appropriate (S572:NO), then in S574, the boot area rewrite enabling mode flag is set to ON and the already-executed processes are reset. On the other hand, when the checksum is appropriate (S572:YES), then the program proceeds to S580 in the same manner as in the first embodiment.

The main program execution routine of FIGS. 17 and 18 is the same as that of FIG. 11 in the first embodiment except that S590–S598 and S200 are added in the routine of FIGS. 17 and 18.

According to this routine, in S590 the boot area rewrite enabling mode flag is initially set to OFF, and in S592 input from the operation panel 22 is awaited. When key input is received (S592:YES), then in S594 it is judged whether or not the key input is for requesting change in the boot area rewrite mode. If so (S594:YES), then in S596 the boot area rewrite enabling mode flag is changed. For example, when the flag has been ON, it is turned off in S596, and when the flag has been OFF, it is turned on in S596.

On the other hand, when the key input is not a request to change the boot area rewrite mode (S594:NO), then in S598 it is judged whether or not the key input is performed from the flash memory rewrite mode key for rewriting the flash memory 12. If so (S598:YES), then the download processes are executed in S200. On the other hand, if the key input is not from the flash memory rewrite mode key (S598:NO), then processes from S610 and on are performed in the same manner as in the first embodiment.

As described above, according to the present embodiment, when the boot area rewrite enabling mode flag is being set to ON (S512:YES), then in S520 to S580, the boot loader area 30 is rewritten with loader program data received by the parallel I/F unit 16 from the personal computer 16. On the other hand, when the boot area rewrite enabling mode flag is being set to OFF (no in S512), received loader program data (S514:NO) is deleted and is not written in the boot loader area 30 in S516. With this configurations only when the boot area rewrite enabling mode flag is being set to ON, the loader program can be rewritten. Accordingly, the boot loader program can be reliably prevented from being erroneously rewritten without taking any trouble hardware measure.

Also, when the boot area rewrite enabling mode flag is being set to OFF (S512:NO) and when it is judged that the address in the received data is not the address in the boot area (S514:YES), then the data rewrite operations are performed in S520 to S580 because the received data is data for the main program, that is, other than the loader program. As a result, data from other than the loader program can be reliably updated.

As described above, according to the present embodiment, when the rewrite mode is set to the multi-function device 10 to enable writing of the loader program data, then the loader program storage region 30 can be rewritten or updated according to loader program data received from the personal computer PC by the parallel I/F unit 16. Contrarily, when the rewrite mode is not being set, the loader program storage region 30 will not be rewritten.

Only when the rewrite mode is being set, the loader program can be rewritten. Therefore, the boot loader program can be reliably prevented from being erroneously rewritten without taking troublesome hardware measure.

Even when the rewrite mode is not being set, when main program data is received, the main program region 40 can be properly rewritten with the received main program data. On the other hand, when the rewrite mode is not being set, if loader program data is received and if the received loader program data has erroneous address data, the loader program region 30 will be incorrectly rewritten. Accordingly, the received loader program data will all be deleted and will not be written in S516.

While the invention has been described in detail with reference to the specific embodiments thereof, it would be apparent to those skilled in the art that various changes and modifications may be made therein without departing from the spirit of the invention, the scope of which is defined by the attached claims.

For example, in the above-described embodiments, the model type/country distinguishing password serves as data indicative of a specification (model type and country) of the multifunction device 10, to which the subject program is to be used. The password is transmitted from the personal computer PC as reference data appended directly before the program data. The password is also transmitted as data for being written into the region 42 of the flash memory 12 as included in the program data directly after the body of the program data. However, there is no need to append the password as the reference data directly before the program data. The password may be included only in the program data as data to be written into the region 42. However, in this case, the password has to be referred to after the program data has been taken in from the personal computer PC. Accordingly, it becomes necessary to temporarily store the program data in a buffer. Accordingly, a special buffer needs to be provided in the multi-function device 10. Contrarily, according to the above-described embodiments, by appending the password as the reference data directly before the program data, the password can be referred to before the program data is received. Accordingly, it becomes unnecessary to provide such a special buffer. By thus appending the password as reference data directly before the update program data, the multi-function device is not necessarily provided with any additional memory.

Further, a variety of different rewritable, non-volatile memories can be used instead of the flash memory 12.

The above-described embodiments are related to the multifunction device. The multi-function device is one type of a data storage device that can be downloaded with programs for controlling operations of various electronic processing devices or portions, such as the printer 18, the scanner 20, and the like. However, the present invention can be applied to other various types of data storage device that can be downloaded with various control data, such as control programs and a variety of information, for controlling operations of the various types of electronic processing devices.

What is claimed is:

1. A data storage device, comprising:
   a rewritable nonvolatile memory that stores control data, wherein the control data includes identification data for identifying a type of control data;
   mode setting means for selectively setting a predetermined download operation mode and the mode setting means includes a rewritable mode setting means for setting a rewritable mode to allow the downloading means to write the inputted control data over the already-stored control data in the rewritable memory; and
   downloading means for performing a downloading operation to receive inputted control data and to write the inputted control data to the nonvolatile memory according to a selectively-set download operation mode, the downloading means includes comparing means for comparing the identification data, included in the inputted control data, with other identification data, included in already-stored control data, in the rewritable nonvolatile memory, and a rewriting means for writing the inputted control data over the already-stored control data when the comparing means determines that the identification data, included in the inputted control data, matches the other identification data, included in the already-stored control data, wherein the rewritable mode setting means controls, during the rewritable mode, the rewriting means to write the inputted control data over the already-stored control data even when the comparing means determines that the identification data, included in the inputted control data, does not match the other identification data, included in the already-stored control data.

2. A data storage device as claimed in claim 1, wherein the mode setting means includes rewritable mode setting means for selectively setting a rewritable mode to allow the downloading means to write the inputted control data over already-stored control data in the rewritable nonvolatile memory and an initially-writing mode to allow the downloading means to write the inputted control data initially into the rewritable nonvolatile memory.

3. A data storage device as claimed in claim 2, wherein the mode setting means includes:
   determination means for determining whether the inputted control data is to be initially downloaded to the rewritable nonvolatile memory or is to be written over the already-stored control data as update control data;
   first setting means for setting the rewritable mode to allow the downloading means to write the inputted control data over the already-stored control data when the inputted control data is to be written over the already-stored control data as update control data; and
   second setting means for setting the initially-writing mode to allow the down loading means to write the inputted control data into the rewritable nonvolatile memory when the inputted control data is to be initially downloaded to the rewritable nonvolatile memory.

4. A data storage device as claimed in claim 3, wherein the control data includes identification data identifying a type of the control data, further comprising:
   comparing means for comparing the identification data included in the inputted control data with other identification data included in the already-stored control data,
   wherein the rewritable mode setting means controls, during the rewritable mode, the comparing means to perform its comparing operation and the downloading means to write the inputted control data over the already-stored control data when the comparing means determines that the identification data, included in the inputted control data, matches the other identification data included in the already-stored control data, and wherein the second setting means controls, during the initially-writing mode, the downloading means to write the inputted control data without controlling the comparing means to perform its comparing operation.

5. A data storage device as claimed in claim 1, wherein the rewritable mode setting means controls, during the rewritable mode, the rewriting means to write the inputted control data over the already-stored control data without controlling the comparing means to compare the identification data, included in the inputted control data, with the other identification data, included in the already-stored control data.

6. A data storage device as claimed in claim 1, wherein the rewritable mode setting means further includes:

changing mode setting means for enabling a user to set a changing mode to write the inputted control data over the already-stored control data regardless of content of the identification data;

first determination means for determining whether the inputted control data is to be initially downloaded to the rewritable nonvolatile memory or is to be written over the already-stored control data;

second determination means for determining whether or not the user has set the changing mode when the inputted control data is determined to be written over the already-stored control data; and control means for controlling, when the second determination means determines that the user has set the changing mode, the rewriting means to write the inputted control data over the already-stored control data regardless of content of the identification data included in the inputted control data.

7. A data storage device as claimed in claim 6, wherein the control means controls, when the second determination means determines that the user has set the changing mode, the rewriting means to write the inputted control data over the already-stored control data even when the comparing means determines that the identification data, included in the inputted control data, does not match the other identification data included in the already-stored control data.

8. A data storage device as claimed in claim 6, wherein the control means controls, when the second determination means determines that the user has set the changing mode, the rewriting means to write the inputted control data over the already-stored control data without controlling the comparing means to compare the identification data, included in the inputted control data, with the other identification data, included in the already-stored control data.

9. A data storage device as claimed in claim 1, further comprising operation executing means for executing operations based on the control data stored in the rewritable nonvolatile memory.

10. A data storage device as claimed in claim 9,
wherein the control data includes at least one of main program data indicative of a main control program for controlling operation of the operation executing means and loader program data indicative of a loader program for controlling the downloading means to write the main program data to the rewritable nonvolatile memory,
wherein the downloading means includes:
determination means for determining whether the inputted control data includes the main program data or the loader program data; and
rewriting means for writing the inputted control data over the already-stored control data in the rewritable nonvolatile memory, when the determination means determines that the inputted control data includes the main program data, and for failing to write the inputted control data over the already-stored control data in the rewritable nonvolatile memory, when the determination means determines that the inputted control data includes the loader program data,
wherein the rewritable mode setting means controls, during the rewritable mode, the rewriting means to write the inputted control data over the already-stored control data even when the determination means determines that the inputted control data indicates the loader program data.

11. A data storage device as claimed in claim 10, wherein the main program data is appended with predetermined address data, and the loader program data is appended with other predetermined address data, the determination means determining whether the inputted control data includes at least one of the main program data and the loader program data while referring to address data appended with the inputted control data.

12. A data storage device as claimed in claim 10, wherein the rewritable mode setting means includes a loader program rewrite enabling means for enabling a user to set a loader program rewrite enabling mode to write inputted loader program data over an already-stored loaded program, the rewritable mode setting means controlling, during the loader program rewrite enabling mode, the rewriting means to write the inputted loader program data over the already-stored loader program data.

13. A data storage device as claimed in claim 9, wherein the downloading means further includes:
receiving and transmitting means for receiving inputted control data and transmitting a signal; and
writing means for writing the inputted control data to the rewritable nonvolatile memory, wherein the rewritable mode setting means allows, during the rewritable mode, the receiving and transmitting means to receive the inputted control data regardless of a condition of the operation executing means.

14. A data storage device as claimed in claim 13, wherein the receiving and transmitting means receives the inputted control data and transmits a predetermined signal indicative of the condition of the operation executing means, and wherein the rewritable mode setting means prohibits, during the rewritable mode, the receiving and transmitting means from transmitting the predetermined signal, thereby allowing the receiving and transmitting means to receive the inputted control data.

15. A data storage device as claimed in claim 14, wherein the rewritable mode setting means enables a user to set a signal output prohibition mode to prohibit the receiving and transmitting means from transmitting the predetermined signal, thereby allowing the receiving and transmitting means to receive the inputted control data.

16. A data storage device as claimed in claim 13, wherein the operation executing means includes printing means for printing data onto a print medium according to the control data, and the receiving and transmitting means transmits a busy signal during operation of the printing means and transmits a print medium empty signal when the printing means has run out of the print medium.

17. A data storage device as claimed in claim 1, further comprising:
notifying means for notifying a present download condition with a different notification form for each download process that downloads the inputted control data to the rewritable nonvolatile memory.

18. A data storage device as claimed in claim 17, wherein the notifying means includes sound producing means for producing different sounds of at least one of tone and duration for each download process.

19. A data storage device as claimed in claim 18, wherein the notifying means includes sound producing means for producing different sounds of a combination of the tone and the duration for each download process.

20. A data storage device as claimed in claim 17, wherein the notifying means includes sound producing means for producing a different successive series of sounds of at least one of the tone and a silent time interval between the successive sounds for each download process.

21. A data storage device as claimed in claim 20, wherein the notifying means includes sound producing means for producing a different successive series of sounds of a combination of the tone and the silent time interval for each download process.

22. A data storage device, comprising:
a rewritable nonvolatile memory including:
a control data storing region for storing control data such as a program and a variety of information for controlling operations of an electronic processing device; and
a specification indication data storage region for storing specification indication data that indicates specifications of the electronic processing device controlled by the control data;
reception means for receiving transmitted control data and specification indication data;
collating means for collating the transmitted specification indication data with the specification indication data stored in the specification indication data storage region, when the reception means receives the transmitted specification indication data;
updating means for rewriting the control data storage region using the transmitted control data received by the reception means, when the transmitted specification indication data and the specification indication data collated by the collating means match; and
mode setting means for setting a specific rewritable mode for rewriting the control data storage region using the transmitted control data received by the reception means, the updating means rewriting, during the specific rewritable mode set by the mode setting means, the control data storage region using the transmitted control data received by the reception means even when the transmitted specification indication data and the specification indication data collated by the collating means do not match and even when the collating means does not perform a collating operation.

23. A data storage device as claimed in claim 22, wherein the mode setting means includes an operation panel provided with a plurality of keys for enabling a user to set the specific rewritable mode through operating a predetermined combination of the keys.

24. A data rewriting device, comprising:
a rewritable nonvolatile memory including:
a control data storing region for storing control data such as a program and a variety of information for controlling operations of an electronic processing device; and
a loader program storage region for storing loader program data for controlling load operations of the control data into the control data storing region during both initial load of the control data and update of the control data;
reception means for receiving transmitted control data and loader program data transmitted from an external transmission device;
mode setting means for setting a rewrite mode enabling rewrite of the transmitted loader program data; and
rewrite means for rewriting the loader program storing region using the transmitted loader program data received by the reception means, when the mode setting means sets the rewrite mode, the rewrite means failing to rewrite the loader program storing region using the transmitted loader program data received by the reception means when the mode setting means does not set the rewrite mode.

25. A data rewrite device as claimed in claim 24, wherein each of the control data and the loader program data is appended with different address data.

26. A data rewrite device as claimed in claim 25, further comprising:
determination means for determining whether transmitted data received by the reception means is control data based on appended address data, the rewrite means rewriting the control data storing region using the transmitted control data when the determination means determines that the transmitted data received by the reception means includes control data.

27. A data rewrite device as claimed in claim 26, further comprising:
deletion means for deleting the transmitted data received by the reception means when the determination means determines, while the rewrite mode is not set, that the transmitted data received by the reception means is not control data.

28. A printing systems comprising:
a print device including:
transmission/reception means for receiving print data and control data and for transmitting a specific control signal indicative of a condition of the print device;
print means for printing images on a print medium based on the received print data; and
a rewritable nonvolatile memory for storing the control data such as programs and a variety of information for controlling operations of the print means;
an external transmission device, connected to the print device, for transmitting the control data and the print data and for receiving the specific control signal;
prevention means for outputting a prevention signal to the transmission/reception means to prevent the transmission/reception means from transmitting the specific control signal; and
update means for rewriting the rewritable nonvolatile memory using the transmitted control data, when the prevention means outputs the prevention signal.

29. A print system as claimed in claim 28, wherein the prevention means and the update means are provided in the print device.

30. A print system as claimed in claim 29, wherein the specific control signal includes at least one of a print medium empty signal and a busy signal that are outputted corresponding to a printing impossible condition of the print means.

31. A print system as claimed in claim 29, wherein the prevention means includes an operation panel having a plurality of keys to enable a user to set a prevention mode to output the prevention signal to the transmission/reception means.

32. A print system as claimed in claim 31, wherein the operation panel enables the user to set the prevention mode to output the prevention signal to the transmission/reception means through operation of a predetermined combination of the keys.

33. A data storage device, comprising:

a rewritable nonvolatile memory that stores control data;

mode setting means for selectively setting a predetermined download operation mode; and downloading means for performing a downloading operation to receive inputted control data and to write the inputted control data to the rewritable nonvolatile memory according to a selectively-set download operation mode, wherein the mode setting means includes a rewritable mode setting means for setting a rewritable mode to allow the downloading means to write the inputted control data over the already-stored control data in the rewritable nonvolatile memory, wherein the control data includes identification data for identifying a type of the control data, and wherein the downloading means includes:

comparing means for comparing the identification data included in the inputted control data with other identification data included in the already-stored control data in the rewritable nonvolatile memory; and rewriting means for writing the inputted control data over the already-stored control data when the comparing means determines that the identification data, included in the inputted control data, matches the other identification data included in the already-stored control data, wherein the rewritable mode setting means controls, during the rewritable mode, the rewriting means to write the inputted control data over the already-stored control data regardless of whether the identification data, included in the inputted control data, matches the other identification data included in the already-stored data.

34. A data storage device, comprising:

a rewritable nonvolatile memory that stores control data, wherein the control data includes identification data for identifying a type of control data;

mode setting means for selectively setting a predetermined download operation mode and the mode setting means includes a rewritable mode setting means for setting a rewritable mode to allow the downloading means to write inputted control data over already-stored control data in the rewritable nonvolatile memory; and downloading means for performing a downloading operation to receive inputted control data and to write the inputted control data to the nonvolatile memory according to a selectively-set download operation mode, wherein the downloading means includes comparing means for comparing the identification data included in the inputted control data with other identification data included in the already-stored control data in the rewritable nonvolatile memory, and a rewriting means for writing the inputted control data over the already-stored control data when the comparing means determines that the identification data, included in the inputted control data, matches the other identification data included in the already-stored control data, wherein the rewritable mode setting means controls, during the rewritable mode, the rewriting means to write the inputted control data over the already-stored control data without controlling the comparing means to compare the identification data, included in the inputted control data, with the other identification data, included in the already-stored control data.

35. A data storage device as claimed in claim 34, wherein the mode setting means further includes an initially-writing mode to allow the downloading means to write the inputted control data initially into the rewritable nonvolatile memory.

36. A data storage device as claimed in claim 34, wherein the mode setting means further includes:

determination means for determining whether the inputted control data is to be initially downloaded to the rewritable nonvolatile memory or is to be written over the already-stored control data as update control data;

first setting means for setting the rewritable mode to allow the downloading means to write the inputted control data over the already-stored control data when the inputted control data is to be written over the already-stored control data as update control data; and second setting means for setting an initially-writing mode to allow the down loading means to write the inputted control data into the rewritable nonvolatile memory when the inputted control data is to be initially downloaded to the rewritable nonvolatile memory.

37. A data storage device as claimed in claim 34, wherein the rewritable mode setting means controls, during the rewritable mode, the comparing means to perform its comparing operation and the downloading means to write the inputted control data over the already-stored control data when the comparing means determines that the identification data, included in the inputted control data, matches the other identification data included in the already-stored control data, and an initially-writing mode setting means controls, during the initially-writing mode, the downloading means to write the inputted control data without controlling the comparing means to perform its comparing operation.

38. A data storage device, comprising:

a rewritable nonvolatile memory that stores control data, wherein the control data includes identification data for identifying a type of control data;

mode setting means for selectively setting a predetermined download operation mode and the mode setting means includes a rewritable mode setting means for setting a rewritable mode to allow the downloading means to write inputted control data over already-stored control data in the rewritable nonvolatile memory; and downloading means for performing a downloading operation to receive inputted control data and to write the inputted control data to the nonvolatile memory according to a selectively-set download operation mode, wherein the downloading means includes comparing means for comparing the identification data included in the inputted control data with other identification data included in the already-stored control data in the rewritable nonvolatile memory, and rewriting means for writing the inputted control data over the already-stored control data when the comparing means determines that the identification data, included in the inputted control data, matches the other identification data included in the already-stored control data, and wherein the rewritable mode setting means further includes:

changing mode setting means for enabling a user to set a changing mode to write the inputted control data over the already-stored control data regardless of content of the identification data;
first determination means for determining whether the inputted control data is to be initially downloaded to the rewritable nonvolatile memory or is to be written over the already-stored control data;
second determination means for determining whether or not the user has set the changing mode when the inputted control data is determined to be written over the already-stored control data; and
control means for controlling, when the second determination means determines that the user has set the changing mode, a rewriting means to write the inputted control data over the already-stored control data regardless of content of the identification data included in the inputted control data.

39. A data storage device as claimed in claim 38, wherein the mode setting means further includes an initially-writing mode to allow the downloading means to write the inputted control data initially into the rewritable nonvolatile memory.

40. A data storage device as claimed in claim 38, wherein the mode setting means further includes:
first setting means for setting the rewritable mode to allow the downloading means to write the inputted control data over the already-stored control data when the inputted control data is to be written over the already-stored control data as update control data; and
second setting means for setting an initially-writing mode to allow the down loading means to write the inputted control data into the rewritable nonvolatile memory when the inputted control data is to be initially downloaded to the rewritable nonvolatile memory.

41. A data storage device as claimed in claim 38, wherein the rewritable mode setting means controls, during the rewritable mode, the comparing means to perform its comparing operation and the downloading means to write the inputted control data over the already-stored control data when the comparing means determines that the identification data, included in the inputted control data, matches the other identification data included in the already-stored control data, and an initially-writing mode setting means controls, during the initially-writing mode, the downloading means to write the inputted control data without controlling the comparing means to perform its comparing operation.

42. A data storage device, comprising:
a rewritable nonvolatile memory that stores control data;
operation executing means for executing operations based on the control data stored in the rewritable nonvolatile memory, wherein the control data includes at least one of main program data indicative of a main control program for controlling operation of the operation executing means and loader program data indicative of a loader program for controlling downloading means to write the main program data to the rewritable nonvolatile memory;
mode setting means for selectively setting a predetermined download operation mode and the mode setting means includes a rewritable mode setting means for setting a rewritable mode to allow the downloading means to write inputted control data over the already-stored control data in the rewritable nonvolatile memory; and
downloading means for performing a downloading operation to receive inputted control data and to write the inputted control data to the nonvolatile memory according to a selectively-set download operation mode, wherein the downloading means further includes:
determination means for determining whether the inputted control data includes the main program data or the loader program data; and
rewriting means for writing the inputted control data over the already-stored control data in the rewritable nonvolatile memory, when the determination means determines that the inputted control data includes the main program data, and for failing to write the inputted control data over the already-stored control data in the rewritable nonvolatile memory, when the determination means determines that the inputted control data includes the loader program data,
wherein the rewritable mode setting means controls, during the rewritable mode, rewriting means to write the inputted control data over the already-stored control data even when the determination means determines that the inputted control data indicates the loader program data.

43. A data storage device as claimed in claim 42, wherein the mode setting means further includes an initially-writing mode to allow the downloading means to write the inputted control data initially into the rewritable nonvolatile memory.

44. A data storage device as claimed in claim 42, wherein the mode setting means further includes:
determination means for determining whether the inputted control data is to be initially downloaded to the rewritable nonvolatile memory or is to be written over the already-stored control data as update control data;
first setting means for setting the rewritable mode to allow the downloading means to write the inputted control data over the already-stored control data when the inputted control data is to be written over the already-stored control data as update control data; and
second setting means for setting an initially-writing mode to allow the down loading means to write the inputted control data into the rewritable nonvolatile memory when the inputted control data is to be initially downloaded to the rewritable nonvolatile memory.

45. A data storage device as claimed in claim 42, wherein the control data includes identification data identifying a type of the control data, further comprising:
comparing means for comparing the identification data included in the inputted control data with other identification data included in the already-stored control data,
wherein the rewritable mode setting means controls, during the rewritable mode, the comparing means to perform its comparing operation and the downloading means to write the inputted control data over the already-stored control data when the comparing means determines that the identification data, included in the inputted control data, matches the other identification data included in the already-stored control data, and an initially-writing setting means controls, during the initially-writing mode, the downloading means to write the inputted control data without controlling the comparing means to perform its comparing operation.

46. A data storage device, comprising:
a rewritable nonvolatile memory that stores control data;
operation executing means for executing operations based on the control data stored in the rewritable nonvolatile memory;
mode setting means for selectively setting a predetermined download operation mode and the mode setting means includes a rewritable mode setting means for setting a rewritable mode to allow the downloading means to write inputted control data over already-stored control data in the rewritable nonvolatile memory; and downloading means for performing a downloading operation to receive inputted control data and to write the inputted control data to the nonvolatile memory according to a selectively-set download operation mode, wherein the downloading means further includes:
  receiving and transmitting means for receiving inputted control data and transmitting a signal; and
  writing means for writing the inputted control data to the rewritable nonvolatile memory, wherein the rewritable mode setting means allows, during the rewritable mode, the receiving and transmitting means to receive the inputted control data regardless of a condition of the operation executing means.

47. A data storage device as claimed in claim 46, wherein the mode setting means further includes an initially-writing mode to allow the downloading means to write the inputted control data initially into the rewritable nonvolatile memory.

48. A data storage device as claimed in claim 46, wherein the mode setting means further includes:
  determination means for determining whether the inputted control data is to be initially downloaded to the rewritable nonvolatile memory or is to be written over the already-stored control data as update control data;
  first setting means for setting the rewritable mode to allow the downloading means to write the inputted control data over the already-stored control data when the inputted control data is to be written over the already-stored control data as update control data; and
  second setting means for setting an initially-writing mode to allow the down loading means to write the inputted control data into the rewritable nonvolatile memory when the inputted control data is to be initially downloaded to the rewritable nonvolatile memory.

49. A data storage device as claimed in claim 46, wherein the control data includes identification data identifying a type of the control data, further comprising:
  comparing means for comparing the identification data included in the inputted control data with other identification data included in the already-stored control data,
  wherein the rewritable mode setting means controls, during the rewritable mode, the comparing means to perform its comparing operation and the downloading means to write the inputted control data over the already-stored control data when the comparing means determines that the identification data, included in the inputted control data, matches the other identification data included in the already-stored control data, and an initially-writing setting means controls, during the initially-writing mode, the downloading means to write the inputted control data without controlling the comparing means to perform its comparing operation.

50. A data storage device, comprising:
a rewritable nonvolatile memory that stores control data;
mode setting means for selectively setting a predetermined download operation mode;
downloading means for performing a downloading operation to receive inputted control data and to write the inputted control data to the nonvolatile memory according to a selectively-set download operation mode; and
notifying means for notifying a present download condition with a different notification form for each download process that downloads the inputted control data to the rewritable nonvolatile memory.

* * * * *